(12) United States Patent
Juen et al.

(10) Patent No.: US 7,519,268 B2
(45) Date of Patent: Apr. 14, 2009

(54) IMAGE RECORDING APPARATUS, DYNAMIC IMAGE PROCESSING APPARATUS, DYNAMIC IMAGE REPRODUCTION APPARATUS, DYNAMIC IMAGE RECORDING APPARATUS, INFORMATION RECORDING / REPRODUCTION APPARATUS AND METHODS EMPLOYED THEREIN, RECORDING MEDIUM WITH COMPUTER PROGRAM STORED THEREIN

(75) Inventors: Masahiro Juen, Yokohama (JP); Masaharu Ito, Shinjuku-ku (JP); Hirotake Nozaki, Kawasaki (JP); Masahide Tanaka, Kawasaki (JP); Kenji Toyoda, Chigasaki (JP)

(73) Assignee: Nikon Corporation, Tokyo (JP)

( * ) Notice: Subject to any disclaimer, the term of this patent is extended or adjusted under 35 U.S.C. 154(b) by 1234 days.

(21) Appl. No.: 10/423,969

(22) Filed: Apr. 28, 2003

(65) Prior Publication Data
US 2003/0210898 A1 Nov. 13, 2003

Related U.S. Application Data

(63) Continuation of application No. 09/290,166, filed on Apr. 13, 1999, now abandoned.

(30) Foreign Application Priority Data

| Apr. 14, 1998 | (JP) | 10-102375 |
| May 29, 1998 | (JP) | 10-150178 |
| May 29, 1998 | (JP) | 10-150179 |
| May 29, 1998 | (JP) | 10-150180 |
| May 29, 1998 | (JP) | 10-150181 |
| May 29, 1998 | (JP) | 10-150182 |
| May 29, 1998 | (JP) | 10-150183 |

(51) Int. Cl.
H04N 5/91 (2006.01)
H04N 5/00 (2006.01)
H04N 7/26 (2006.01)

(52) U.S. Cl. .......................... 386/68; 386/117; 386/109

(58) Field of Classification Search ................. 386/117, 386/107, 46, 109, 111, 112, 27, 33, 68
See application file for complete search history.

(56) References Cited

U.S. PATENT DOCUMENTS

| 5,040,061 | A | * | 8/1991 | Yonemitsu | 375/240.13 |
| 5,282,049 | A | * | 1/1994 | Hatakenaka et al. | 386/111 |
| 5,377,051 | A | | 12/1994 | Lane et al. | |
| 5,404,316 | A | | 4/1995 | Klinger et al. | |
| 5,477,337 | A | | 12/1995 | Schuler | |
| 5,513,306 | A | | 4/1996 | Mills et al. | |

* cited by examiner

Primary Examiner—Robert Chevalier
(74) Attorney, Agent, or Firm—Oliff & Berridge, PLC

(57) ABSTRACT

The image recording apparatus according to the present invention is provided with a conversion device that converts an optical image of a subject to an electrical signal, a recording circuit that records the electrical signal achieved through the conversion device in a storage device as image data and a display control circuit that detects an available capacity at the storage device and the length of time that power supply by a source is possible and displays them on a display as available capacity information and remaining power supply time information. The available capacity information indicates the length of available recording time remaining at the available capacity that has been detected.

6 Claims, 38 Drawing Sheets

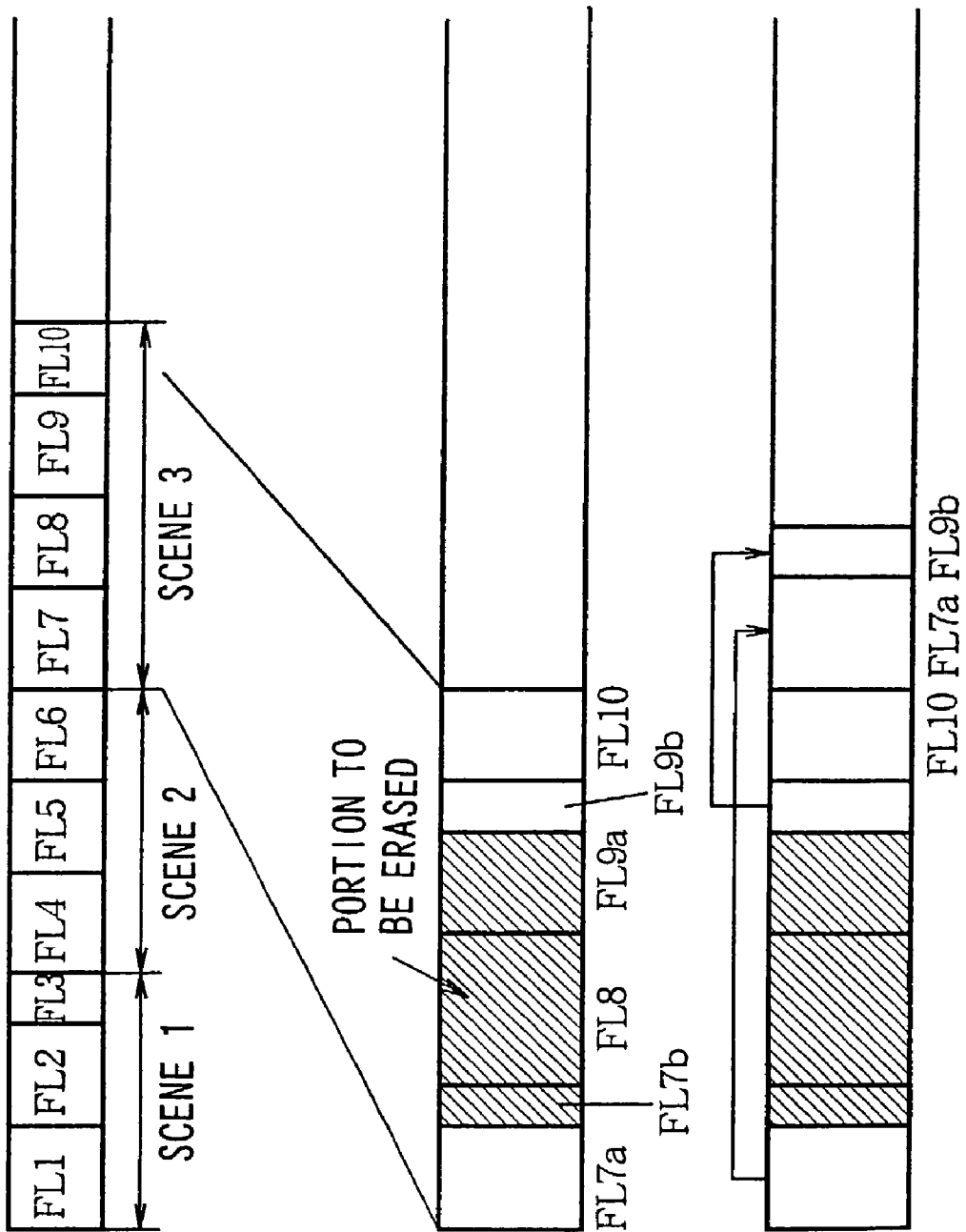

PORTION TO BE ERASED IS SHADED

RECORDING-IN-PROGRESS SCREEN

FIG. 22

| ELAPSED TIME (MINUTES) | ASSUMED MINIMUM REMAINING TIME (MINUTES) | ASSUMED MAXIMUM REMAINING TIME (MINUTES) | REMAINING CAPACITY FOR ACTUAL CONSUMPTION (%) | ACTUAL DISPLAY MINIMUM (MINUTES) | ACTUAL DISPLAY MAXIMUM (MINUTES) | ACTUAL DISPLAY AVERAGE (MINUTES) |
|---|---|---|---|---|---|---|
| 0 | 10 | 20 | 100 | 10 | 20 | 15 |
| 1 | 9 | 19 | 90 | 9 | 18 | 13.5→14 |
| 2 | 8 | 18 | 86 | 8.6→9 | 17.2→17 | 12.9→3 |
| 3 | 7 | 17 | 80 | 8 | 16 | 12 |
| 4 | 6 | 16 | 75 | 7.5→8 | 15 | 11.25→11 |
| 5 | 5 | 15 | 65 | 6.5→7 | 13 | 9.75→10 |
| 6 | 4 | 14 | 58 | 5.8→6 | 11.6→12 | 8.7→9 |
| 7 | 3 | 13 | 50 | 5 | 10 | 7.5→8 |
| 8 | 2 | 12 | 40 | 4 | 8 | 6 |
| 9 | 1 | 11 | 35 | 3.5→4 | 7 | 5.25→5 |
| 10 | 0 | 10 | 32 | 3.2→3 | 6.4→6 | 4.8→5 |
| 11 | | 9 | 25 | 2.5→3 | 5 | 3.75→4 |
| 12 | | 8 | 15 | 1.5→2 | 3 | 2.25→2 |
| 13 | | 7 | 10 | 1 | 2 | 1.5→2 |
| 14 | | 6 | 2 | 0.2→0 | 0.4→0 | 0.3→0 |
| 15 | | 5 | 0 | 0 | 0 | 0 |
| 16 | | 4 | | | | |
| 17 | | 3 | | | | |
| 18 | | 2 | | | | |
| 19 | | 1 | | | | |
| 20 | | 0 | | | | |

IMAGE RECORDING APPARATUS, DYNAMIC IMAGE PROCESSING APPARATUS, DYNAMIC IMAGE REPRODUCTION APPARATUS, DYNAMIC IMAGE RECORDING APPARATUS, INFORMATION RECORDING / REPRODUCTION APPARATUS AND METHODS EMPLOYED THEREIN, RECORDING MEDIUM WITH COMPUTER PROGRAM STORED THEREIN

This is a Continuation of application Ser. No. 09/290,166 filed Apr. 13, 1999 now abandoned. The entire disclosure of the prior application is hereby incorporated by reference herein in its entirety.

The disclosures of the following priority applications are herein incorporated by reference:
Japanese Patent Application No. 10-102375, filed Apr. 14, 1998
Japanese Patent Application No. 10-150178, filed May 29, 1998
Japanese Patent Application No. 10-150179, filed May 29, 1998
Japanese Patent Application No. 10-150180, filed May 29, 1998
Japanese Patent Application No. 10-150181, filed May 29, 1998
Japanese Patent Application No. 10-150182, filed May 29, 1998
Japanese Patent Application No. 10-150183, filed May 29, 1998

BACKGROUND OF THE INVENTION (1) Field of the Invention

The present invention relates to an image recording apparatus that displays the remaining recording capacity, a dynamic image processing apparatus that divides dynamic images and records them in a storage device that allows random access, a dynamic image reproduction apparatus that reproduces dynamic image data recorded in a recording medium that allows random access and a dynamic image recording apparatus that allows recorded dynamic images to be edited.

In addition, the present invention relates to an information recording/reproduction apparatus and a method employed therein and a recording medium that allow the mode that has been set during the previous operating session and the contents in the recording medium to be indicated to the user.

(2) Description of the Related Art

Today, video cameras that photograph and record dynamic images are widely used. In such video cameras, magnetic tape such as an 8 mm video cassette is employed as the recording medium for recording image data. An 8 mm video cassette, which is a sequential access medium, i.e., a recording medium that does not allow random access, presents the following problems.

(1) The problem described below typically arises when recording images on an 8 mm video cassette having image data recorded discretely on the tape. In order to ascertain the position in the tape at which recording is possible and the length of time recording is possible, "play," "fast-forward" and "rewind" must be performed repeatedly and the lengths of time during which recording is possible must be added together to display an accurate remaining recording time. In addition, there is a problem in that even when there are portions of the tape in which recording is possible, recording is not practically possible if these portions are discrete and in separate locations.

(2) When reproducing an 8 mm video cassette in which, for instance, an unnecessary scene that the user does not wish to reproduce is recorded between scenes that the user wishes to reproduce continuously, the user must perform an operation such as a fast-forward during reproduction or the user must copy in advance the scenes he wishes to reproduce on another 8 mm video cassette.

(3) When dynamic images are compressed and recorded as dynamic image files, the recorded dynamic images can be edited or erased only after the compressed dynamic images are expanded. Thus, in order to edit a large volume of data image files, a large-capacity memory for storing the expanded dynamic image files is required.

(4) When recording using a tape, a portion of which has already been used for recording, the information (images) that has already been recorded is erased if the recording is started at the wrong position on the tape.

(5) There is a problem with video cameras in the prior art having separate buttons for receiving user operation instructions such as power on/off, record, play, fast-forward and the like, in that the operation becomes complex.

In addition, two modes, i.e., a mode mainly for performing recording (hereafter referred to as the photographing mode) and a mode mainly for performing operations such as reproduction and editing of contents recorded in a recording medium (hereafter referred to as the disk operation mode) are available at the power switch in a movie camera that performs photographing of dynamic images or still images, i.e., a video camera. In many cases, the power switch of a movie camera is also utilized for the selection of these modes. In other words, in a movie camera, a switch for selecting either the photographing mode or the disk operation mode is provided and when either of the modes is selected by operating the switch, power is turned on.

Since, in such a movie camera in the prior art, no means is provided for indicating to the user the mode that was set during the previous operating session or the contents in the recording medium, the user is required to make notes on these points and save them from one operating session to the next.

SUMMARY OF THE INVENTION

A first object of the present invention is to achieve display of the remaining recording time by detecting the available capacity in the storage device.

In order to achieve this object, the image recording apparatus according to the present invention comprises a conversion device that converts an optical image of a subject to an electrical signal, a recording circuit that records the electrical signal achieved through the conversion performed by the conversion device into a storage device as image data and a display control circuit that detects the available capacity at the storage device and the remaining length of time that power can be supplied by a source and displays this information on a display as available capacity information and remaining power supply time information.

The available capacity information indicates the length of recording time remaining at the available capacity that has been detected.

Alternatively, in order to achieve the object described above, the image recording apparatus according to the present invention comprises a conversion device that converts an optical image of a subject to an electrical signal, a recording circuit that records the electrical signal achieved through the conversion performed by the conversion device in a storage device as image data and a display control circuit that detects the length of time that information can be recorded in the storage device and the length of time that power can be supplied by the source and displays the remaining recording time or the remaining power supply time on a display in correspondence to the results of comparison of the remaining recording time and the remaining power supply time.

The display control circuit indicates the remaining power supply time on the display when the remaining power supply time is shorter than the remaining recording time. When the remaining recording time is longer than the remaining power supply time, the remaining power supply time is displayed flashing.

Alternatively, in order to achieve the object described above, the image recording apparatus according to the present invention comprises a conversion device that converts an optical image of a subject to an electrical signal, a recording circuit that records the electrical signal achieved through the conversion performed by the conversion device in the storage device as dynamic image data and a display control circuit that displays the length of time that information can be recorded at the storage device on a display when setting is made to erase dynamic image data recorded in the storage device.

The display control circuit displays the length of remaining recording time on the display, which increases in correspondence to the amount of dynamic image data set to be erased.

A second object of the present invention is to achieve editing of dynamic images without requiring a large-capacity memory.

In order to achieve the object described above, the dynamic image processing apparatus according to the present invention is provided with an image processing circuit that receives data of dynamic images that are continuous over time to form divisional specific units of dynamic images for recording, compresses each of the dynamic images in the divisional specific units thus formed and records them as different files in a storage device.

The image processing circuit records dynamic images every specific time or specific data quantity as a plurality of units. Alternatively, dynamic images may be formed every specific number of GOPs as a plurality of units of sets of GOPs, to be compressed and recorded through the MPEG method. In addition, the image processing circuit records information indicating continuity over time of a plurality of dynamic image files that have been recorded. When the apparatus is further provided with a photographing device that photographs a moving object to form dynamic images, dynamic images photographed by the photographing device are recorded as a plurality of divisional units of dynamic images.

A third object of the present invention is to achieve an improvement in the operability when reproducing photographed dynamic image data.

In order to achieve the object described above, the dynamic image reproduction apparatus according to the present invention comprises a reproduction circuit that reproduces a plurality of sets of image data that are recorded in a storage device and are constituted of a plurality of sets of dynamic image data having continuity over time and a reproduction control circuit that selects either a first reproduction mode for reproducing only selected sets of image data among the plurality of sets of image data or a second reproduction mode for sequentially reproducing the plurality of sets of image data in a specific order and controls the reproduction circuit by ensuring that dynamic images are reproduced in correspondence to the selected reproduction mode.

The dynamic image reproduction apparatus may be further provided with a reproduction instruction device that issues an instruction for reproduction of dynamic image data and a data selection device that selects one set of image data among the plurality of sets of image data stored in the storage device so that the reproduction control circuit can control the reproduction circuit to ensure that selected image data are reproduced when the data selection device is operated and the plurality of sets of image data are sequentially reproduced in a specific order when the reproduction instruction device is operated.

In addition, the reproduction control circuit may control the reproduction circuit so that when image data are first selected by the data selection device and then an instruction for a reproduction start is issued by the reproduction instruction device, the image data selected by the data selection device are reproduced and then the image data following this image data are sequentially reproduced.

It is desirable that image data be sequentially reproduced in the chronological order in which they were photographed.

A fourth object of the present invention is to facilitate the editing work and to ensure that the editing work is implemented free of errors.

In order to achieve the object described above, the dynamic image recording apparatus according to the present invention comprises a photographing device that photographs a moving object to form dynamic images, a recording circuit that records the dynamic images in a storage device, a reproduction circuit that reproduces the dynamic images recorded in the storage device, a display device that displays the dynamic images reproduced by the reproduction circuit and a specification device that specifies on the display an editing range within the dynamic images reproduced by the reproduction circuit.

Alternatively, in order to achieve the object described above, the dynamic image recording apparatus according to the present invention may comprise a photographing device that photographs a moving object to form dynamic images, a recording circuit that records the dynamic images in a storage device, a reproduction circuit that reproduces the dynamic images recorded in the storage device, a display device that displays the dynamic images reproduced by the reproduction circuit, a specification device that specifies on the display an editing range within the dynamic images reproduced by the reproduction circuit and a display control circuit that controls the reproduction circuit so that the dynamic images within the editing range specified by the specification device and the non-editing range are displayed in a comprehensible manner when the reproduction circuit reproduces dynamic images to be displayed on the display.

Alternatively, in order to achieve the object described above, the dynamic image recording apparatus according to the present invention may comprise a photographing device that photographs a moving object to form dynamic images, a recording circuit that records the dynamic images in a storage device, a reproduction circuit that reproduces the dynamic images recorded in the storage device, a display device that displays the dynamic images reproduced by the reproduction circuit, a specification device that specifies on the display an editing range within the dynamic images reproduced by the reproduction circuit and a reproduction control circuit that controls the reproduction circuit to ensure that the dynamic images within the non-editing ranges preceding and following the editing range specified by the specification device are continuously displayed by skipping the editing range when the reproduction circuit reproduces dynamic images to be displayed on the display.

The specification device described above is capable of specifying a range within the dynamic images to be erased.

A fifth object of the present invention is to achieve an improvement in the operability when erasing dynamic images.

In order to achieve the object described above, the dynamic image reproduction apparatus according to the present invention comprises a reproduction circuit that reproduces dynamic image data stored in a storage device and a means for inquiry that inquires of the user as to whether or not a specific type of processing is to be performed on the dynamic image data reproduced by the reproduction circuit.

The specific type of processing above refers to processing in which the dynamic image data reproduced by the reproduction circuit are erased or processing in which erasure is disabled. The dynamic image reproduction apparatus may be further provided with a decision-making circuit that makes a decision as to whether or not the specific type of processing has been performed on the dynamic image data reproduced by the reproduction circuit. In addition, the apparatus may be further provided with a display so that an inquiry by the means for inquiry can be displayed on the display.

A sixth object of the present invention is to simplify the operation by accepting user operation instructions at a common button.

In order to achieve the object described above, the dynamic image recording apparatus according to the present invention comprises a mode selector device that switches between a recording mode and a reproduction mode, a photographing device that photographs a moving object to form dynamic images, a reproduction circuit that reproduces dynamic image data stored in a storage device in the reproduction mode and an instruction device that issues an instruction for a power supply start through a user operation, with the mode selector device switching to the reproduction mode when the power supply is started through an operation on the instruction device.

Alternatively, in order to achieve the object described above, the dynamic image reproduction apparatus according to the present invention may be provided with a reproduction mode selector device that switches the reproduction mode to a dynamic image reproduction mode for reproducing dynamic images or to a still image reproduction mode for reproducing still images and an instruction device operated by the user to issue an instruction for a pause in dynamic image reproduction in the dynamic image reproduction mode. In response to a user operation of the instruction device, the reproduction mode selector device switches from the dynamic image reproduction mode to the still image reproduction mode.

Alternatively, in order to achieve the object described above, the dynamic image reproduction apparatus according to the present invention may be provided with a reproduction mode selector device that switches the reproduction mode to a dynamic image reproduction mode for reproducing dynamic images or to a still image reproduction mode for reproducing still images and an instruction device operated by the user to issue an instruction for fast-forwarding in the dynamic image reproduction mode and a reproduction circuit that achieves frame feed reproduction of still images in response to a user operation of the instruction device in the still image reproduction mode.

Alternatively, in order to achieve the object described above, the dynamic image reproduction apparatus according to the present invention may be provided with a reproduction mode selector device that switches the reproduction mode to a dynamic image reproduction mode for reproducing dynamic images or to a still image reproduction mode for reproducing still images and an instruction device operated by the user to issue an instruction for a rewind in the dynamic image reproduction mode and a reproduction circuit that achieves frame reverse reproduction of still images in response to a user operation of the instruction device in the still image reproduction mode.

A seventh object of the present invention is to enable indication of the mode that has been set during the previous operating session and the contents in the recording medium to the user.

In order to achieve the object described above, the information recording/reproduction apparatus according to the present invention is provided with an image-capturing device that captures images of a specific subject and generates corresponding image signals, a recording circuit that records the image signals generated by the image-capturing device in an image storage device as image files, a reproduction circuit that reproduces the image files recorded in the image storage device by the recording circuit, a mode storage device that stores at least either a first mode related to generating image signals or a second mode related to image files recorded in the image storage device as the mode that is set when power is turned off, and a setting circuit that sets either the first mode or the second mode in conformance to the contents stored in the mode storage device when power is turned on.

The present invention may be implemented as follows.

(1) The information recording/reproduction apparatus may be further provided with a first display control circuit that allows display of setting details related to the generation of image signals by the image-capturing device when the setting circuit is executing setting for the first mode and a second display control circuit that allows display of a representative image or the file name of a representative file among image files recorded in the image storage device when the setting circuit is executing setting for the second mode.

(2) When power is turned on and the setting circuit sets the first mode or the second mode in correspondence to the contents stored in the mode storage device, the second display control circuit displays a representative image or the file name of an image file, whereas when the contents stored in the mode storage device indicate the first mode, it erases the display of the representative image or the file name after a specific length of time has elapsed.

(3) The information recording/reproduction apparatus may be further provided with an instruction device that issues instructions for an emergency start of generating image signals by the image-capturing device and an emergency start of image file recording by the image storage device when the first mode or the second mode is set by the setting circuit.

(4) The image storage device is constituted of a recording medium that can be freely loaded into or ejected from the apparatus main body, and the information recording/reproduction apparatus may be further provided with a decision-making circuit that makes a decision as to whether or not a recording medium is loaded when the first mode or the second mode has been set by the setting circuit and a third display control circuit that allows display of a warning indicating that no recording medium is loaded when it is decided by the decision-making circuit that no recording medium has been loaded.

(5) The information recording/reproduction apparatus may be further provided with a fourth display control circuit which, when the instruction device issues an instruction for a start of image signal generation by the image-capturing device and a start of image file recording by the recording medium after the decision-making circuit has decided that no recording medium is loaded, allows display of the warning by the third display control circuit to be superimposed on the image signal generated by the image-capturing device.

(6) The information recording/reproduction apparatus may be further provided with an instruction prohibition device that prohibits the instruction device from issuing an instruction for a start of image signal generation by the image-capturing device and a start of image file recording by the image storage device, with the setting circuit starting to set the first mode when such a prohibition on the instruction device effected by the instruction prohibition device is canceled.

(7) The information recording/reproduction apparatus may be further provided with an ejection prohibition device that prohibits ejection of the recording medium when the setting circuit is executing setting the first mode or the second mode.

(8) The information recording/reproduction apparatus may be further provided with an interruption circuit that interrupts the setting operation performed by the setting circuit when the user issues an instruction for power off while the setting circuit is setting the first mode or the second mode and a verification circuit that verifies with the user in regard to whether or not power is to be turn off. In this structure, when the verification circuit has verified that power is to be turned off, the power is turned off, whereas if the verification circuit has verified that power is not to be turned off, the setting circuit continues the setting operation.

(9) An identification name and the most recent overwrite date on which image files were recorded most recently may be recorded for any recording medium that has been used at least once. In this case, the information recording/reproduction apparatus may be further provided with a medium information storage device that stores the identification name, the most recent overwrite date and the recorded contents with respect to the recording medium that has been loaded, and a search circuit that searches for the identification name and the most recent overwrite date in the recording medium that has been loaded so that the display control circuit allows display of the recorded contents stored in the medium information storage device when the identification name and the overwrite date searched by the search circuit respectively match the identification name and the overwrite date stored in the medium information storage device.

(10) The recorded contents include at least one of the following: the file name and the file size of each image file and the recording capacity of the recording medium.

(11) When the identification name searched by the search circuit and the identification name stored in the medium information storage device match but the most recent overwrite date searched by the search circuit and the date stored in the medium information storage device do not match, the search circuit searches for any image files among the image files recorded in the recording medium that do not match the files stored in the medium information storage device to store in memory the information on these image files that has been searched by the search circuit, whereas when neither the identification name or the most recent overwrite date searched by the search circuit matches the identification name or the most recent overwrite date stored in the medium information storage device, the search circuit searches all the image files recorded in the recording medium and the medium information storage device stores the information related to the image files searched by the search circuit.

(12) The information recording/reproduction apparatus may be further provided with an assignment circuit that assigns a specific identification name to a recording medium that has been loaded for the first time.

The information recording/reproduction method according to the present invention, which is adopted in the information recording/reproduction apparatus provided with an image-capturing device that captures an image of a specific subject and generates a corresponding image signal, a recording circuit that records the image signal generated by the image-capturing device in an image storage device as an image file and a reproduction circuit that reproduces the image file stored in the image storage device by the recording circuit, includes a storage step in which the mode that is set when power is turned off is stored as either a first mode related to image signal generation or a second mode related to image files recorded in the image storage device and a setting step in which either the first mode or the second mode is set in conformance to the contents stored during the storage step when power is turned on.

The recording medium with a computer program stored therein according to the present invention which is employed for recording the computer program utilized in an information recording/reproduction apparatus provided with an image-capturing device that captures an image of a specific subject and generates a corresponding image signal, a recording circuit that records the image signal generated by the image-capturing device in an image storage device as an image file and a reproduction circuit that reproduces the image file recorded in the image storage device by the recording circuit, stores processing therein that includes a storage step in which the mode that is set when power is turned off is stored as either a first mode related to image signal generation or a second mode related to image files recorded in the image storage device and a setting step in which either the first mode or the second mode is set in conformance to the contents stored during the storage step when power is turned on.

BRIEF DESCRIPTION OF THE DRAWINGS

FIGS. 8A–8G illustrate files in which information is recorded;

FIG. 22 illustrates examples of the remaining capacity time displayed in step S34 in FIG. 10;

DETAILED DESCRIPTION OF THE PREFERRED EMBODIMENTS

First Embodiment

Figure 1:
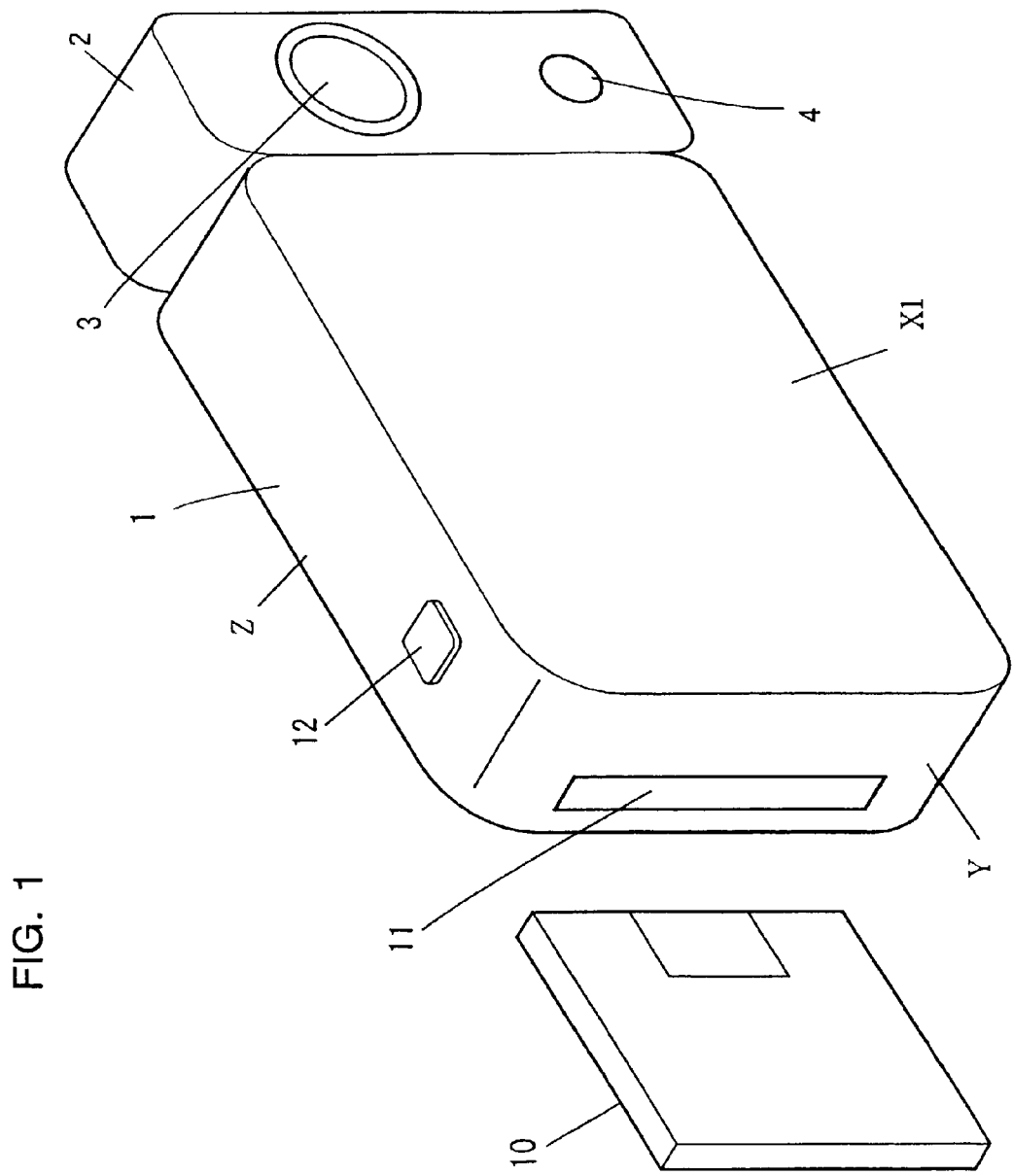
FIG. 1 is a perspective illustrating the structure of a video camera adopting the present invention.
Figure 2:
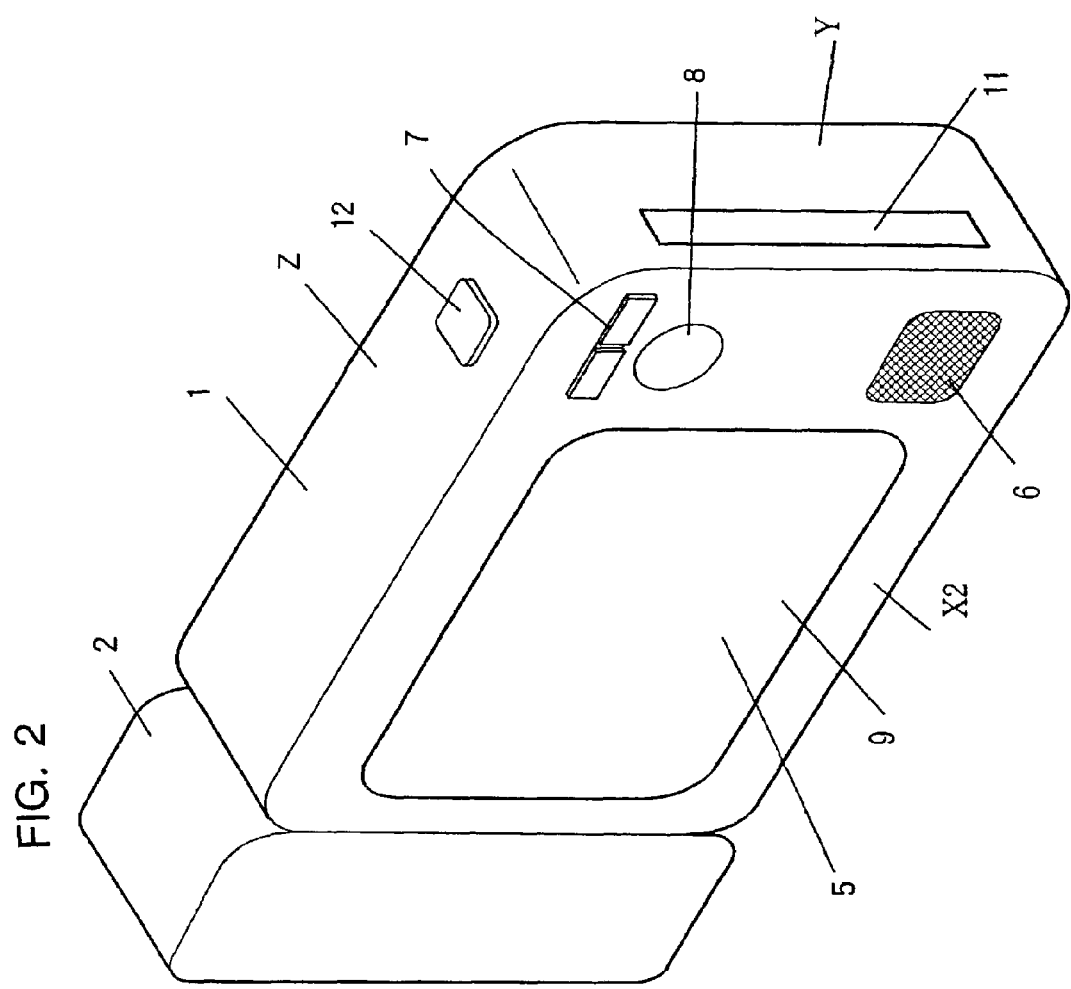
FIG. 2 is a perspective illustrating the structure of the video camera in FIG. 1, viewed from the rear.

FIGS. 1 and 2 are perspectives showing the external structure of a video camera adopting the present invention. This video camera comprises a main body unit 1 and a camera unit 2. In the video camera, the surface positioned toward a subject when photographing the subject is referred to as a surface X1 and the surface positioned toward the user is referred to as a surface X2. At the surface X1 of the camera unit 2, an image-capturing lens 3 that takes in an optical image of the subject and a microphone 4 for collecting audio are provided. It is to be noted that the camera unit 2 is rotatably connected to the main body unit 1. As a result, the user is able to position the taking lens 3 in any direction while monitoring the image displayed on a liquid crystal display 5 (hereafter referred to as the LCD 5).

At the surface X2 of the main body unit 1, the LCD 5 that displays an image input from the image-capturing lens 3 or an image stored at a magneto-optical disk 10, a speaker 6 for outputting a recorded audio, a zoom button 7 that is operated when switching the zooming direction and a start/stop button 8 that is operated when issuing an instruction for a start or a stop of a specific type of processing are provided.

On the surface of the LCD 5, a touch panel 9 for outputting positional data corresponding to a specified position through a touch operation is provided. This touch panel 9, which is constituted of a transparent material such as glass or resin, makes it possible for the user to monitor an image that is displayed on the LCD 5 formed on the inside of the touch panel 9 through the touch panel 9.

A disk slot 11 in which the magneto-optical disk 10, i.e., a recording medium that stores photographed image data and that allows random access, is inserted, is provided at a side surface Y of the video camera. In addition, a power/reset button 12 that is operated when issuing an instruction for turning on the main power or for a reset of a specific type of processing is provided at an upper surface Z of the video camera.

Figure 3:
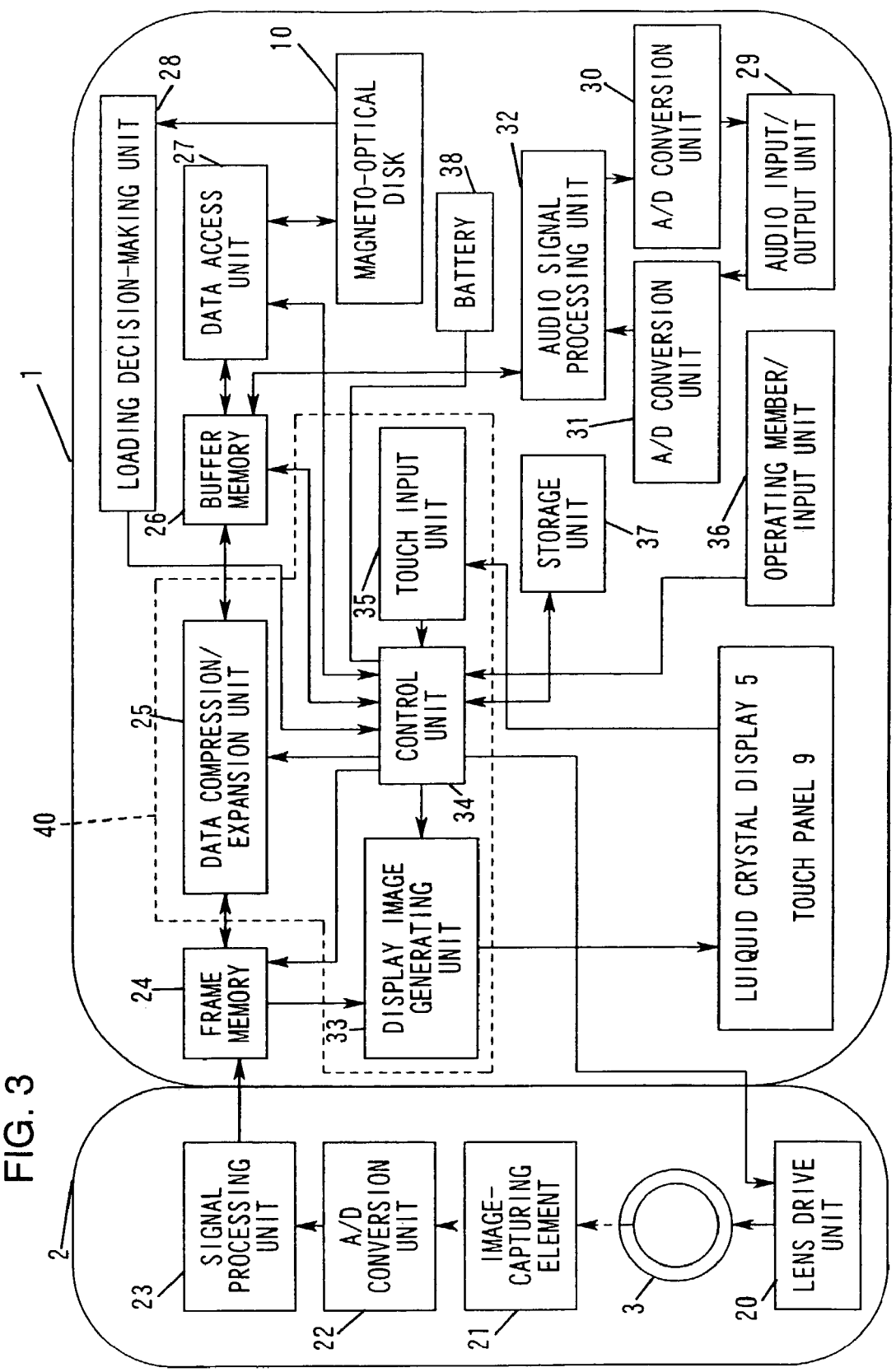
FIG. 3 is a block diagram illustrating the internal electrical structure of the video camera in FIG. 1.

FIG. 3 is a block diagram illustrating the internal electrical structure of the video camera in FIG. 1. A lens drive unit 20, which is controlled by a signal processing unit 23, drives the image-capturing lens 3 to perform corrections such as focusing or zooming. An image-capturing element 21 performs photoelectric transfer of an optical image of the subject formed via the image-capturing lens 3 to convert it to an image signal (electrical signal) to be output to an A/D conversion unit 22. The A/D conversion unit 22 converts the image signal provided by the image-capturing element 21, which is an analog signal, to a digital signal. The signal processing unit 23 implements exposure control of the image-capturing element 21 (e.g., aperture or auto-gain control), and also executes processing such as white balance correction, gamma correction and the like on the image signal provided by the A/D conversion unit 22 to be output to a frame memory 24.

The frame memory 24 stores the image signals provided by the signal processing unit 23 or a data compression/expansion unit 25 in units of a specific number of frames. The data compression/expansion unit 25 compresses an image signal read out from the frame memory 24 by adopting the MPEG (Moving Picture Experts Group) method and outputs the compressed data to a buffer memory 26. It also expands an image signal read out from the buffer memory 26 to output the expanded data to the frame memory 24.

A data access unit 27, which is provided with a recording/reproduction head, drives the loaded magneto-optical disk 10 to record an image signal or an audio signal read out from the buffer memory 26 in the magneto-optical disk 10, and it also reads out an image signal or an audio signal recorded in the magneto-optical disk 10 for output to the buffer memory 26. A loading decision-making unit 28 makes a decision as to whether or not a magneto-optical disk 10 is loaded and outputs the results of the decision-making to a control unit 34.

An audio input/output unit 29 outputs audio input through the microphone 4 to an A/D conversion unit 31 and also outputs an audio signal provided by a D/A conversion unit 30 to the speaker 6. The D/A conversion unit 30 converts the audio signal provided by an audio signal processing unit 32, which is a digital signal, to an analog signal to output to the audio input/output unit 29. The A/D conversion unit 31 converts the audio signal provided by the audio input/output unit 29, which is an analog signal, to a digital signal to be output to the audio signal processing unit 32. The audio signal processing unit 32 compresses an audio signal provided by the A/D conversion unit 31 to output the compressed data to the buffer memory 26 and also expands an audio signal read out from the buffer memory 26 to output the expanded data to the D/A conversion unit 30.

A display image generating unit 33 generates an image that corresponds to the image signal read out from the frame memory 24 and implements monitor display of the image at the LCD 5. A touch panel input unit 35 is provided to output an operational signal (positional signal) provided through the touch panel 9 to the control unit 34. An operating member input unit 36 receives an operational signal from an operating member such as the zoom button 7, the start/stop button 8, the power/reset button 12 or the like and outputs the operational signal to the control unit 34. The control unit 34 implements control of the entire video camera based upon the computer program stored in a storage unit 37. In addition, the control unit 34 is internally provided with a timer (not shown) and is constantly engaged in a time counting operation. In the storage unit 37, which may be constituted of, for instance, a ROM, a RAM, an EEPROM or the like (not shown), data, programs and the like required by the control unit 34 for the execution of various types of processing are recorded as necessary. A battery 38 supplies power to the various units of the video camera.

It is to be noted that the data compression/expansion unit 25, the display image generating unit 33, the touch panel input unit 35 and the control unit 34 are realized through the internal functions of a microprocessor 40.

-Startup Processing-

Figure 4:
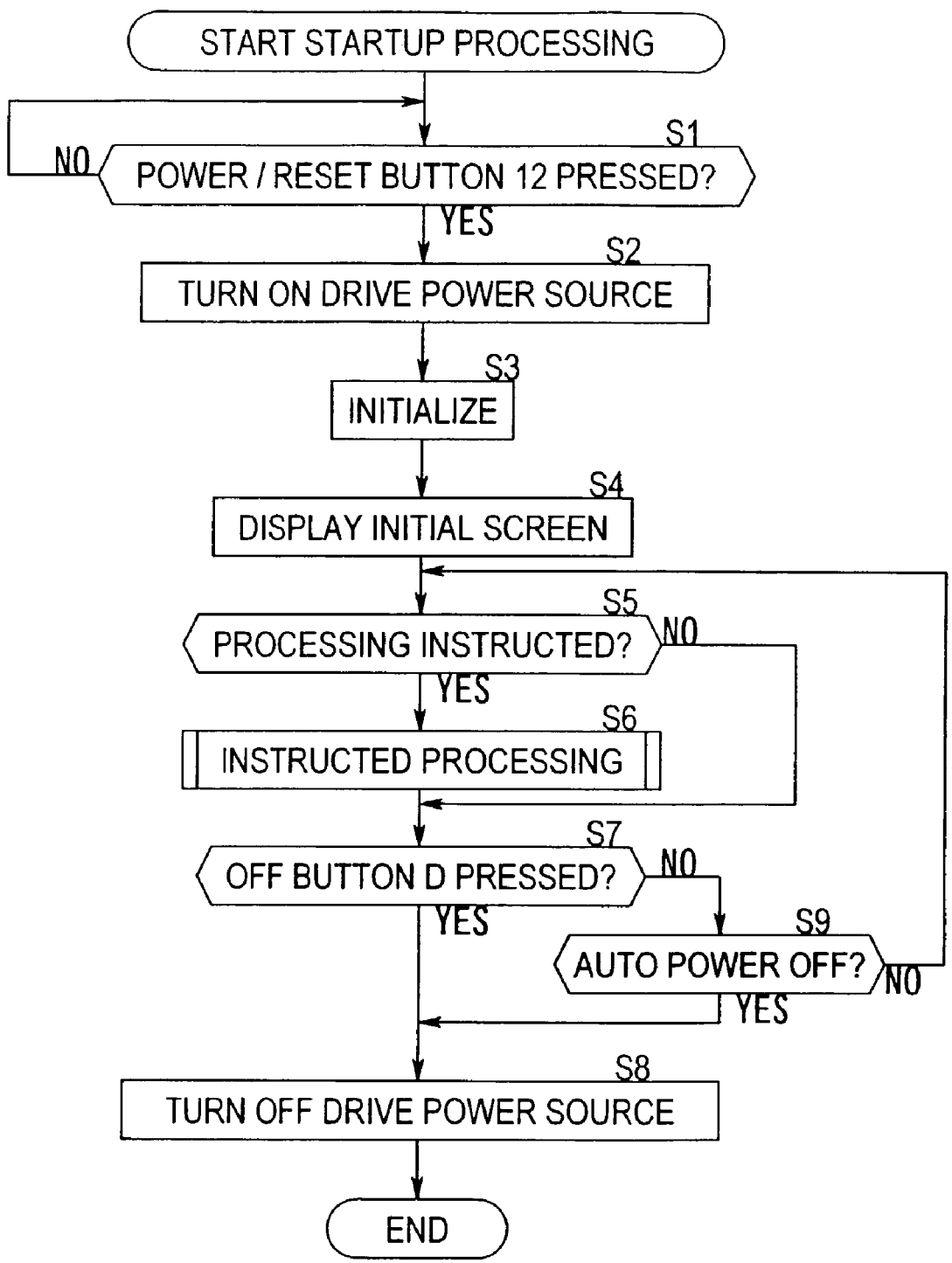
FIG. 4 is a flowchart illustrating the startup processing in the video camera in FIG. 1.

The startup processing performed in the video camera is now explained in reference to the flowchart in FIG. 4. In step S1, the control unit 34 makes a decision or judgement as to whether or not the power/reset button 12 has been pressed based upon a single input through the operating member input unit 36, and if it is decided or judged the power/reset button 12 has not been pressed, the operation remains in a standby state until it is decided that the power/reset button 12 has been pressed. In other words, in this video camera, in order to detect an operation of the power/reset button 12 performed by the user, the standby power is set to ON at all times. When it is decided that the power/reset button 12 has been pressed, the operation proceeds to step S2.

In step S2, the control unit 34 turns on the drive power for the entire video camera. In step S3, the control unit 34 performs initialization of the video camera by reading out and executing a specific computer program stored in the ROM or the like constituting the storage unit 37. In step S4, through the control implemented by the control unit 34, the display image generating unit 33 generates image information for an initial screen which is then output to the LCD 5. The LCD 5 displays the initial screen based upon the input image information. In addition, the control unit 34 starts its internal timer to count the length of the non-operating time.

Figure 5:
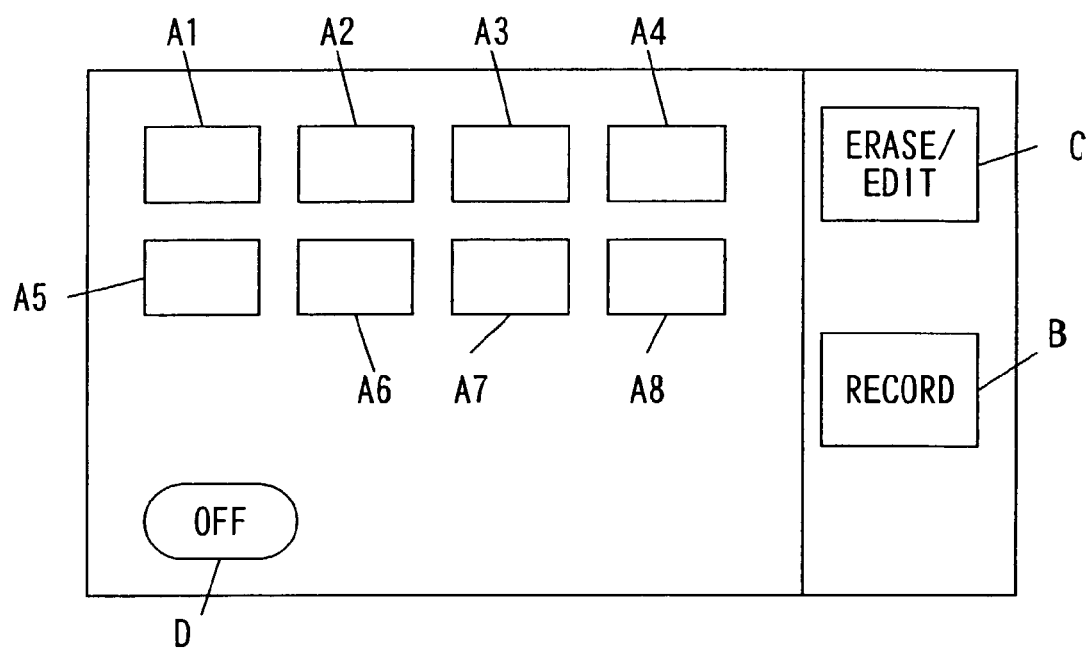
FIG. 5 illustrates the initial screen displayed on the LCD 5 in FIG. 2.

FIG. 5 presents an example of display of the initial image on the LCD 5. At the center of the initial screen, thumbnail images A1~A8 are displayed. The thumbnail images A1~A8 are each achieved by reducing the size of the leading frame of one of the eight scenes (the individual scenes are constituted of a sequence of frames) recorded on the magneto-optical disk 10. The thumbnail images A1~A8 are displayed in the order in which they were photographed. On the right hand side of the screen, a record button B that is operated, i.e., touched, when specifying recording processing and an erase/edit button C that is operated when specifying erase/edit processing are displayed. In addition, in the lower left area of the screen, an OFF button D that is operated, i.e., touched, when turning off the drive source for the entire video camera is displayed.

To continue with the explanation given in reference to FIG. 4, the control unit 34 makes a decision as to whether or not an instruction for any processing has been issued by the user in step S5 and if it is decided that an instruction for processing has been issued, the operation proceeds to step S6.

At this point, if (1) the user touches one of thumbnail images displayed on the LCD 5 twice, (2) the start/stop button 8 is pressed or (3) the start/stop button 8 is pressed after one of thumbnail images has been touched, it is decided that an instruction for reproduction processing has been issued. In correspondence to the specific operation that has been performed among operations (1)~(3), one of the reproduction modes, i.e., a reproduction mode No. 1, a reproduction mode No. 2 or a reproduction mode No. 3, to be detailed later, is selected. In addition, if the record button B displayed at the LCD 5 has been touched, it is decided that an instruction for recording processing has been issued. Furthermore, if the erase/edit button C displayed on the LCD 5 has been touched, it is decided that an instruction for erase/edit processing has been issued.

In step S6, the type of processing specified in step S5 among the reproduction processing, the recording processing and the erase/edit processing is executed.

-Recording Processing-

Figure 6:
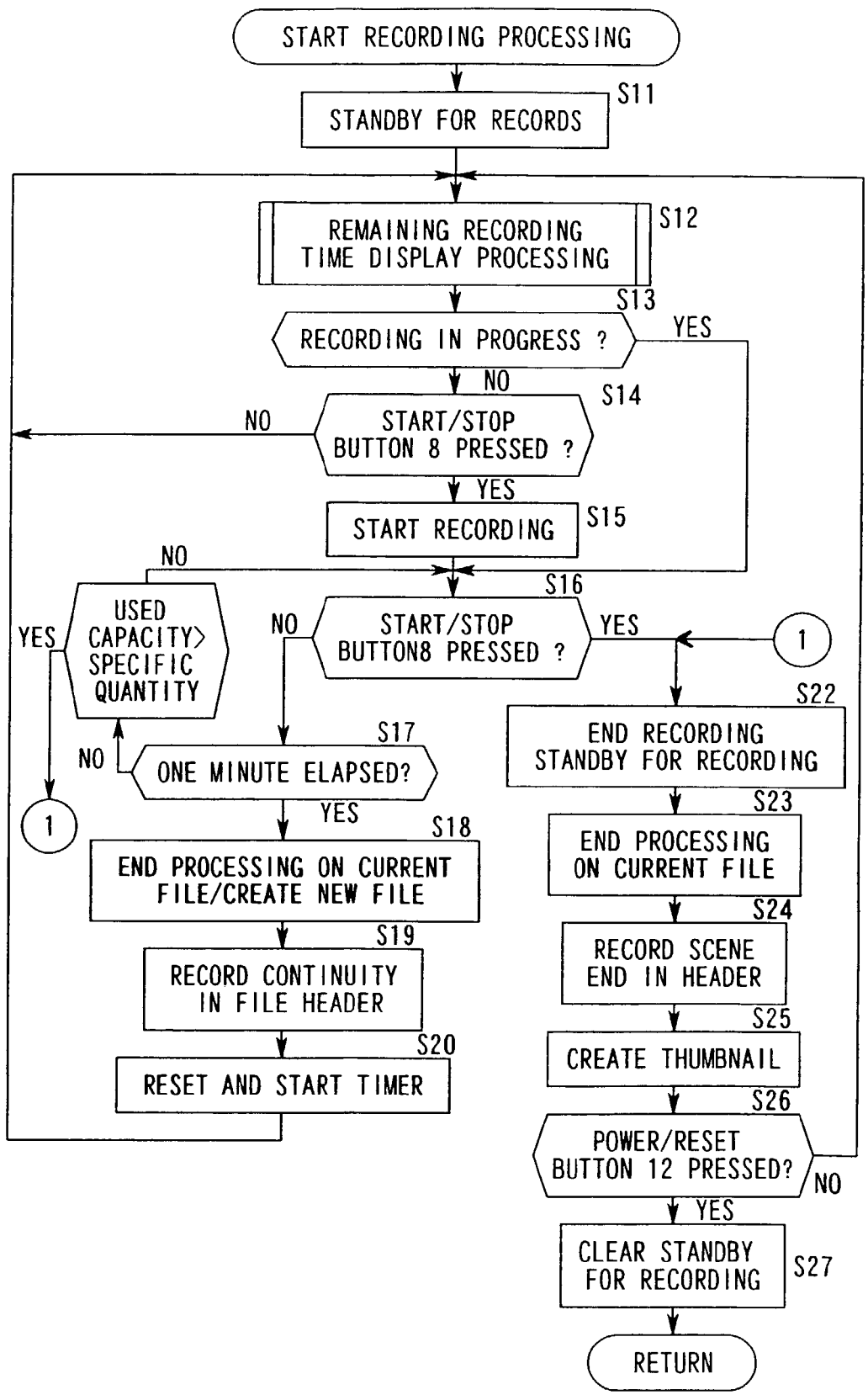
FIG. 6 is a flowchart illustrating the recording processing in the video camera in FIG. 1.

FIG. 6 is a flowchart illustrating the recording processing. In step S11, the video camera is set in a record standby state. Namely, the taking lens 3 forms an optical image of the subject at the image-capturing element 21. The image-capturing element 21 performs photoelectric transfer of the optical image of the subject to convert it to an image signal (electrical signal) and outputs the image signal to the A/D conversion unit 22. The A/D conversion unit 22 converts the image signal that is provided by the image-capturing element 21, which is an analog signal, to a digital signal. The signal processing unit 23 executes processing such as white balance correction for the image signal that has been provided and outputs the processed signal to the frame memory 24. The frame memory 24 stores the image signal provided by the signal-processing unit 23 in units of a specific number of frames. The display image-generating unit 33 generates an image that corresponds to the image signal that has been read out from the frame memory 24 and implements monitor display of the image on the LCD 5.

Figure 7:
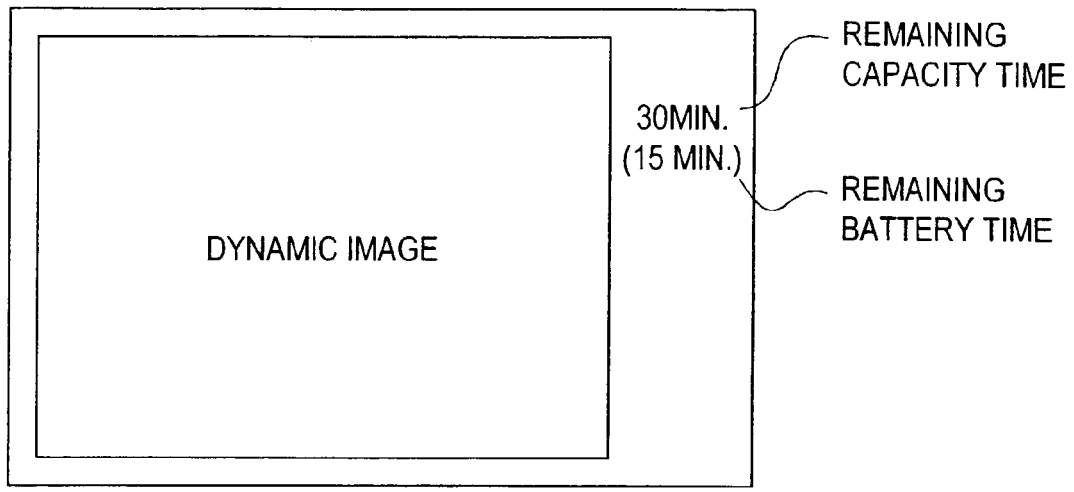
FIG. 7 illustrates the recording standby display screen displayed on the LCD 5 in FIG. 2.

In step S12, the remaining recording time display processing is executed to display the remaining recording time at the right side of the LCD 5, as illustrated in FIG. 7. It is to be noted that details of the remaining recording time display processing are given later. In step S13, the control unit 34 makes a decision as to whether or not recording is currently in progress. If it is decided that recording is not currently in progress, the operation proceeds to step S14. In step S14, the control unit 34 makes a decision as to whether or not the start/stop button 8 has been pressed. If it is decided the start/stop button 8 has been pressed, the operation proceeds to step S15. In step S15, the data compression/expansion unit 25 reads out the image signal from the frame memory 24, compresses it through the MPEG method and outputs it as a new file to the buffer memory 26. At this point, the control unit 34 resets the internal timer.

-Image Files-

Figure 8D:
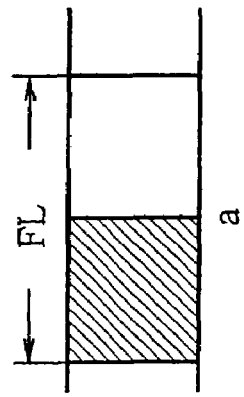

Files in which compressed image information is stored are explained in reference to FIGS. 8A~8G and 9. In this video camera, image information obtained by photographing continuous scenes over time is divided into specific recording time units, e.g., into individual one-minute files, to be recorded. Consequently, when a scene 1 lasting 2 minutes 30 seconds is photographed, the corresponding image information is divided and stored into three files FL1~3, i.e., the files FL1 and FL2, in each of which one minute of image information is stored and the file FL3, in which 30 seconds of image information is stored, as illustrated in FIG. 8A.

Figure 9:
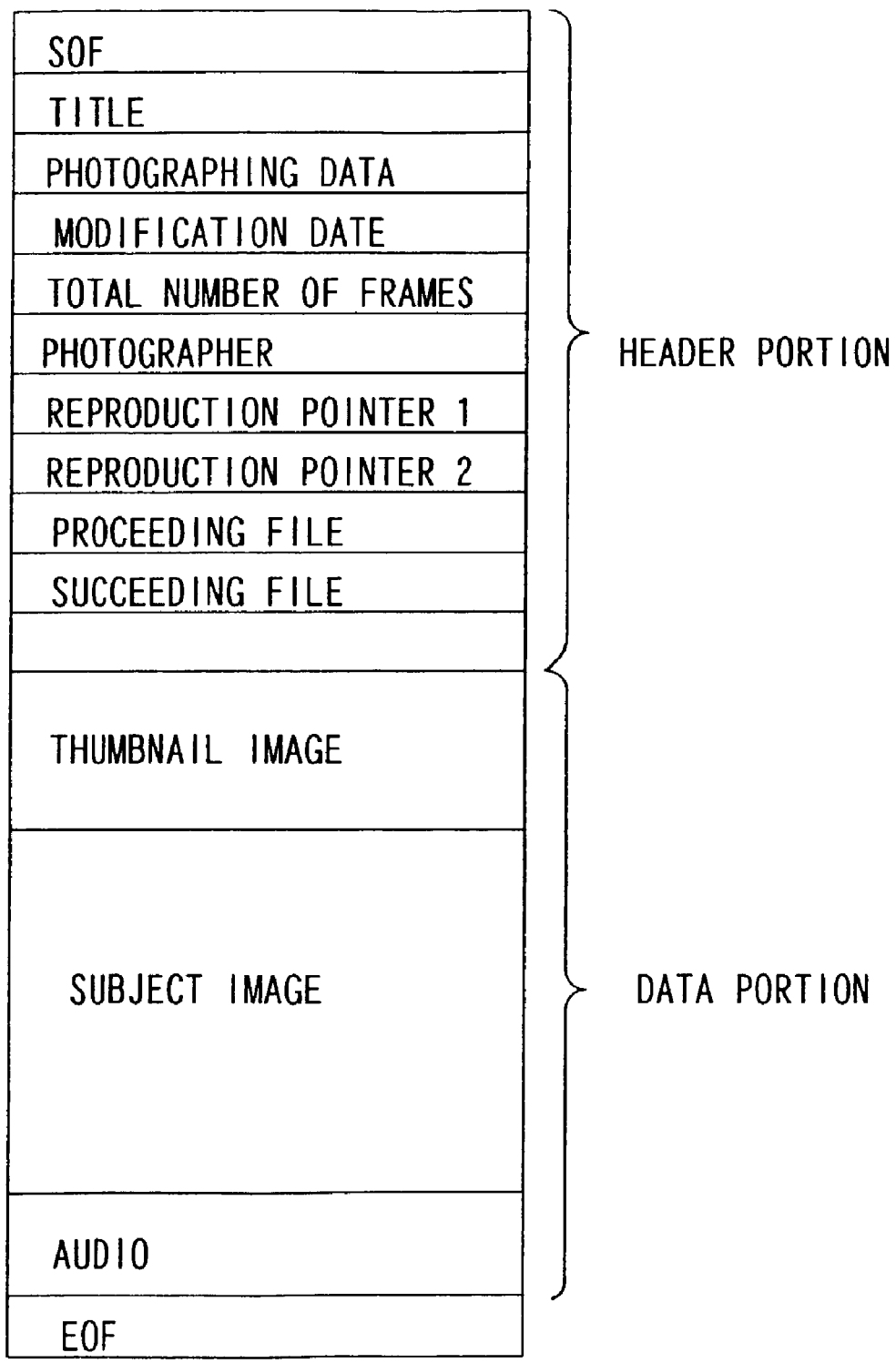
FIG. 9 illustrates a file in which information is recorded.

As illustrated in FIG. 9, each file is constituted of a header portion and a data portion. The header portion contains information indicating the order in which reproduction is performed, a "preceding file" field, a "succeeding file" field and the like. For instance, in the example presented in FIG. 8A, the file FL1 and the file FL3 are each recorded with specific timing in the "preceding file" field and the "succeeding file" field respectively of the file FL2. This makes it possible to reproduce the information in those files continuously even when the files FL1~3 are recorded at separate locations in the magneto-optical disk 10. Each file is constituted of a plurality of frames and the number of frames constituting a given file is recorded in the "total frame number" field.

Any type of information can be entered in a "title" field, a "photographer" field and a "reproduction pointer 1, 2" fields in the header portion through a specific method, e.g. by reading the file into a personal computer. In a "thumbnail image" field of the data portion, information corresponding to an image achieved by reducing a still image of the leading frame of the corresponding scene in the sequence is stored. For instance, in the case of scene 1, the image information of the leading frame in the file FL1 is stored. Thus, no image data are stored in the "thumbnail image" fields of the data portions in the files FL2 and FL3 The "main image" field and "audio" field correspond to the information that has been compressed through the MPEG. The SOF (start of file) and the EOF (end of file) respectively represent information indicating the start and the end of the file.

-Subsequent Recording Processing-

To continue with the explanation given in reference to FIG. 6, the control unit 34 makes a decision as to whether or not the start/stop button 8 has been pressed in step S16. If it is decided that the start/stop button 8 has not been pressed, the operation proceeds to step S17. The control unit 34 makes a decision in step S17 as to whether or not one minute has elapsed on the timer. If it is decided that one minute has elapsed on the timer, the operation proceeds to step S18. In step S18, the data compression/expansion unit 25 records an EOF in the file that is currently being recorded, i.e., the file into which information is currently being written (old file) and creates a new file.

In step S19, a new file name is entered in the "succeeding file" field of the header portion in the old file and the old file name is entered in the "preceding file" field of the header portion in the new file. In step S20, the control unit 34 resets the timer to start counting again.

If it is decided that one minute has not elapsed on the timer in step S17, the operation proceeds to step S21. In step S21, the control unit 34 measures the quantity of information corresponding to the recorded image, and makes a decision as to whether or not the quantity is equal to or more than a specific quantity. If it is decided that the information quantity is more than the specific quantity, the operation returns to step S22, so that the recording end processing is performed on the file. If it is decided that the information quantity is equal to or less than the specific quantity, the operation returns to step S16.

If it is decided in step S16 that the start/stop button 8 has been pressed, the operation proceeds to step S22. In step S22, the data compression/expansion unit 25 stops the compression of the image information. The video camera is set in the record standby state, as in step S11.

In step S23, an EOF is recorded in the file currently storing information (current file). In step S24, an end is recorded in the "succeeding file" field of the header portion of the current file. In step S25, a thumbnail image is created using the image information corresponding to the leading frame of the leading file in the sequence of scenes to record it in the "thumbnail image" field of the leading file.

In step S26, the control unit 34 makes a decision as to whether or not the power/reset button 12 has been pressed. If it is decided that the power/reset button 12 has been pressed, the operation proceeds to step S27. In step S27, the record standby state is cleared and the initial screen (see FIG. 5) is displayed on the LCD 5. If it is decided in step S26 that the power/reset button 12 has not been pressed, the operation returns to step S12.

If it is decided in step S13 that recording is currently in progress, the operation skips steps S14 and S15. If it is decided in step S14 that the start/stop button 8 has not been pressed, the operation returns to step S12.

It is to be noted that while an update is performed to create a new file every time a specific length of time (one minute) has elapsed during recording in the processing described above, an update may be performed to create a new file every time a specific memory capacity (e.g., 5 megabytes) is consumed. Alternatively, an update may be performed to create a new file every time the number of GOPs (group of picture) reaches a specific number (e.g., 100 GOPs).

With dynamic images that are continuous over time divided and recorded into specific time units, it becomes possible to implement dynamic image editing without requiring a large memory capacity.

-Remaining Recording Time Display Processing-

Figure 10:
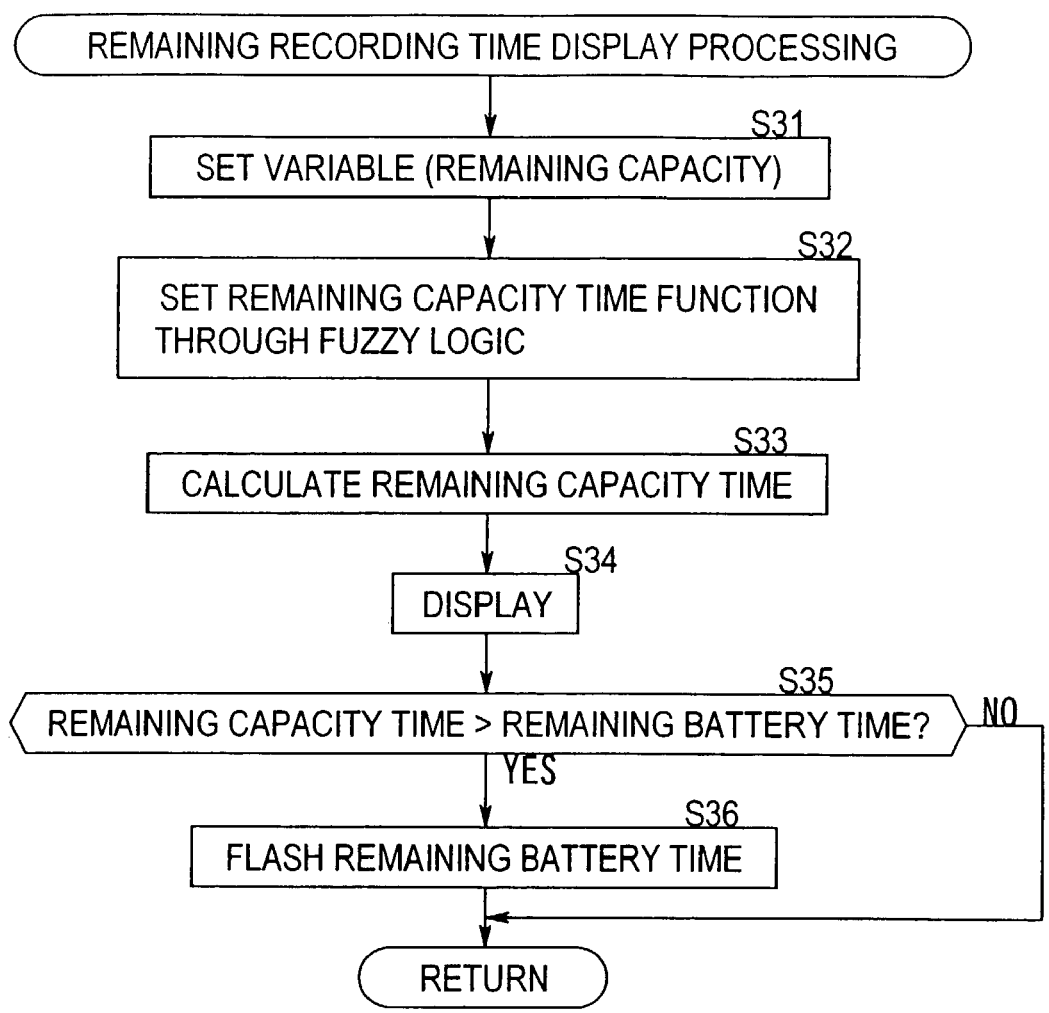
FIG. 10 is a flowchart illustrating the remaining recording time display processing in the video camera in FIG. 1.

Now, the remaining recording time display processing described in reference to step S12 in FIG. 6 is explained in further detail in reference to the flowchart in FIG. 10. In step S31, the control unit 34 controls the data access unit 27 to calculate the remaining capacity in the magneto-optical disk 10 and store the results of the calculation in the storage unit 37 as a variable. The remaining capacity is calculated by adding together the unused capacity with no information entered and the capacity of files classified as the erase directory (to be detailed later) and then subtracting a specific work space capacity to be used for file copying and the like.

In step S32, the control unit 34 causes a remaining capacity time function f to be stored in the storage unit 37. It is to be noted that the remaining capacity time function is achieved by combining a function f1 in which the remaining capacity is a variable, a function f2 in which the record of the storage capacity that has been actually used is a variable, a function f3 in which the characteristics of the subject are a variable, a function f4 in which the state of the taking lens 3 (the focal length value, focus matching length value and the aperture value) is a variable, a function f5 in which the user usage characteristics are a variable and a function f6 in which the fragmentation state of the remaining capacity is a variable through fuzzy logic.

In step S33, the control unit 34 reads out the remaining capacity which is a variable, and the remaining capacity time function from the storage unit 37, and calculates the remaining capacity time (remaining recording time). In addition, the control unit 34 detects the remaining electrical capacity at the battery 38 and converts it to a time period.

Figure 11:
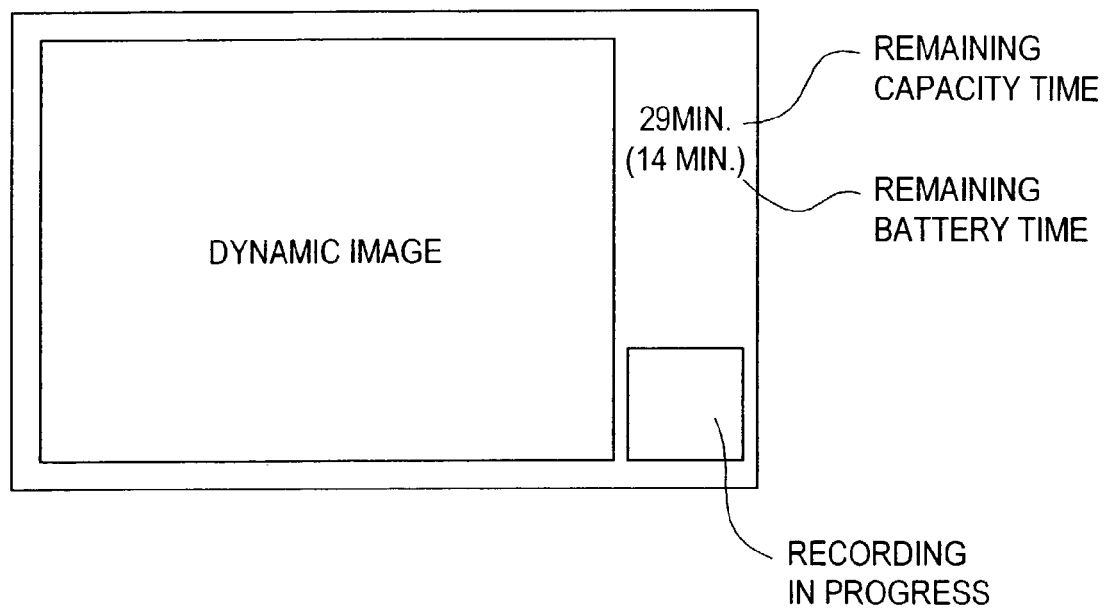
FIG. 11 illustrates an image displayed on the LCD 5 in FIG. 2.

In step S34, the control unit 34 controls the LCD 5 to display the remaining capacity time and the remaining electrical capacity time, i.e., the remaining power supply time (remaining battery time), as illustrated in FIG. 7 (the record standby state). It is to be noted that during recording, "recording" is displayed under the remaining battery time on the LCD 5, as illustrated in FIG. 11.

In step S35, the control unit 34 makes a decision as to whether or not the remaining capacity time is longer than the remaining battery time. If it is decided that the remaining capacity time is longer than the remaining battery time, the operation proceeds to step S36.

In step S36, the control unit 34 controls the LCD 5 to display the remaining battery time in a flashing display. By flashing the remaining battery time on display for emphasis when the remaining capacity time is longer than the remaining battery time in this manner, the user is prevented from making an erroneous decision with respect to the remaining length of time during which he can actually perform photographing. If it is decided in step S35 that the remaining capacity time is not longer than the remaining battery time, the operation skips step S36.

It is to be noted that alternatively in step S34, only the remaining capacity of the magneto-optical disk 10 (the remaining capacity time or the remaining recording capacity) may be displayed with the remaining battery time displayed in step S36. It is also to be noted that a power saving mode for reducing the power consumption by, for instance, reducing the display area on the LCD 5, may be selected in step S36.

The following advantages are achieved by implementing the remaining recording time display processing in FIG. 6.
(1) Since two types of information, i.e., the available capacity at the magneto-optical disk 10 and the remaining battery time at the battery 38 (remaining power supply time) are displayed, the user can ascertain the length of time during which recording is actually possible by checking the two types of information.
(2) Since the remaining recording time for the magneto-optical disk 10 and the length of time during which power can be supplied by the battery 38 are compared and the remaining battery time is displayed flashing if the remaining recording time is longer than the remaining power supply time, the right type of information can be displayed for the user.
(3) Since the remaining recording time at the magneto-optical disk 10 is displayed in a mode in which dynamic image data can be erased, the user can verify the remaining recording time even in an erase enabled state so that the length of remaining recording time that can be obtained through erasure can be ascertained with ease.
(4) When dynamic image data that are to be erased are specified, the length of available recording time remaining corresponding to the area that is obtained after the data erasure is displayed. Thus, the degree to which the recording time will increase as a result of the data erasure can be ascertained with ease.

-Reproduction Processing-

Figure 12:
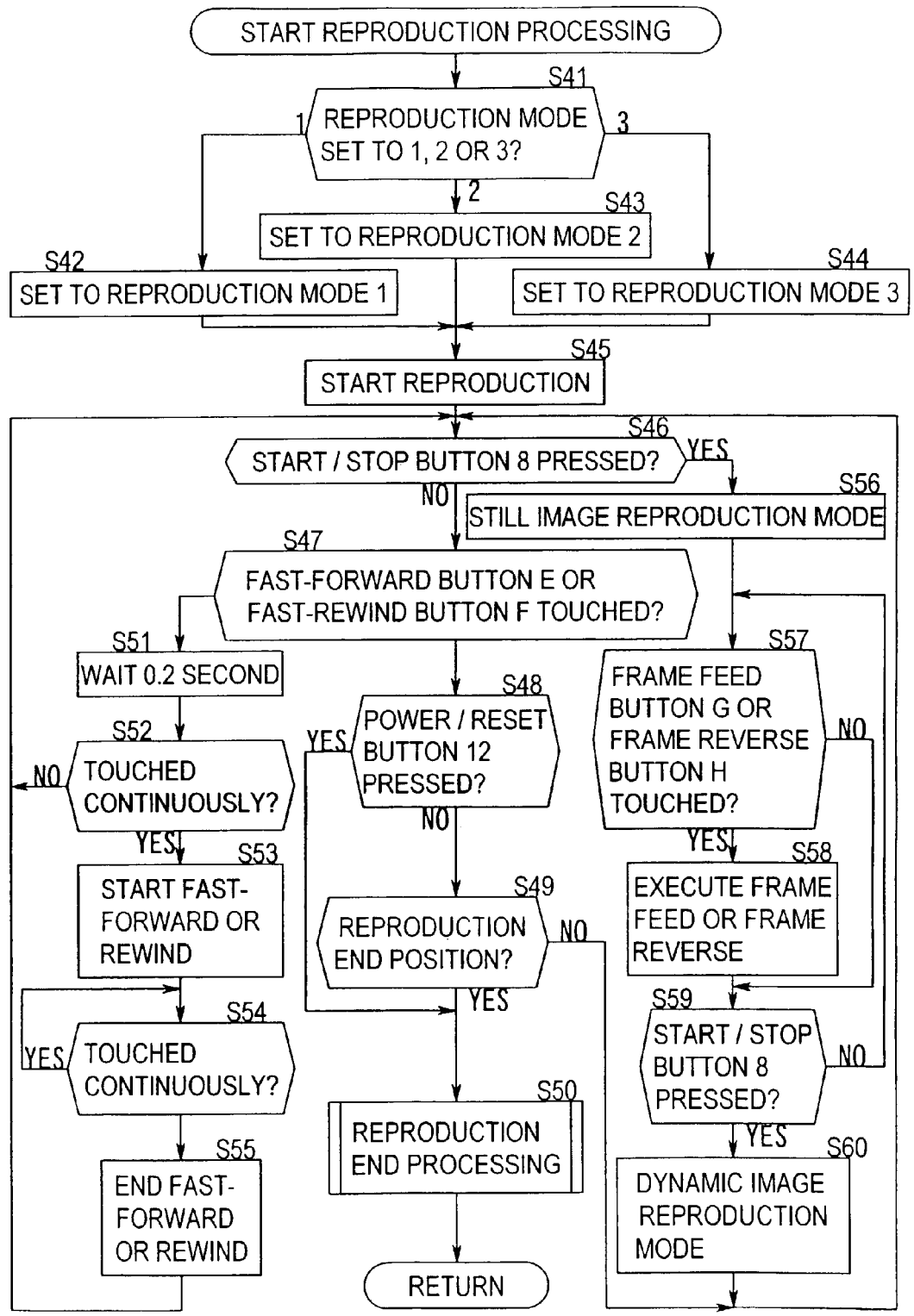
FIG. 12 is a flowchart illustrating the reproduction processing in the video camera in FIG. 1.

FIG. 12 is a flowchart illustrating the reproduction processing performed in the video camera. In step S41, the control unit 34 makes a decision in regard to the method through which the instruction for the reproduction processing was issued in step S5 in FIG. 4.

Namely, if it is decided that the reproduction processing has been started with one of the thumbnail images A1~A8 displayed on the LCD 5 having been touched twice, the operation proceeds to step S42 to set the reproduction mode No. 1. In the reproduction mode No. 1, only a sequence of scenes corresponding to the thumbnail image that has been touched twice among the thumbnail images A1~A8 (e.g., only scene 1 in FIG. 8A) is reproduced.

If it is decided that the reproduction processing has been started with the start/stop button 8 pressed, the operation proceeds to step S43 to set the reproduction mode No. 2. In the reproduction mode No. 2, all the images recorded in the magneto-optical disk 10, e.g., the entire sequence of eight scenes corresponding to the individual thumbnail images A1~A8 in FIG. 5, i.e., all the scenes, are reproduced.

If it is decided that the reproduction processing has been started with the start/stop button 8 pressed after one of the thumbnail images A1~A8 has been touched, the operation proceeds to step S44 to set the reproduction mode No. 3. In the reproduction mode No. 3, all the images that include the thumbnail image that has been touched and the subsequent images, i.e., the entire scene, are displayed. For instance, if the thumbnail image A4 is touched in the example presented in FIG. 5, the sequence of scenes corresponding to the individual thumbnail images A4~A8 are reproduced.

Figure 13:
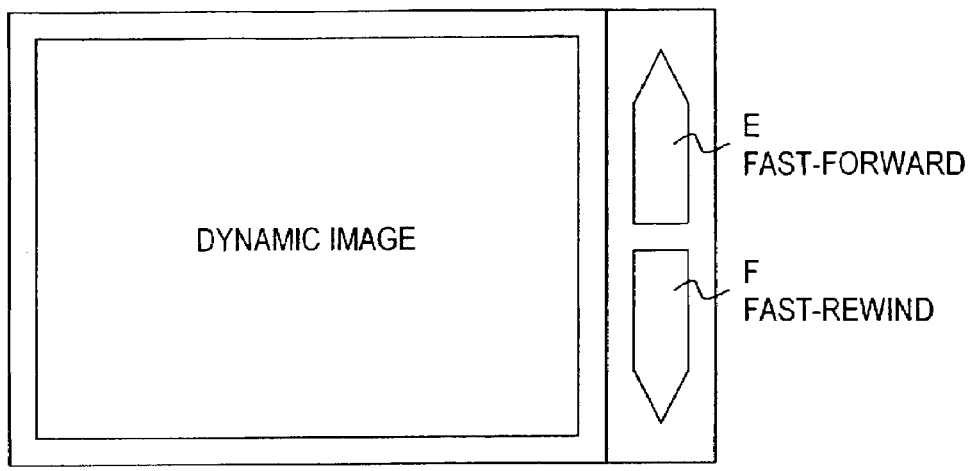
FIG. 13 illustrates an image displayed on the LCD 5 in FIG. 2.

In step S45, the image reproduction is started. Namely, through the control implemented by the control unit 34, the data access unit 27 reads out the image information specified in a step among steps S42~S44 from the magneto-optical disk 10 and output it to the buffer memory 26. The data compression/expansion unit 25 reads out the image information from the buffer memory 26 and expands it before supplying it to the frame memory 24. The display image-generating unit 33 reads the image information from the frame memory 24 and converts it to display information to be provided to the LCD 5. The LCD 5 displays the provided display information at the center of the screen as illustrated in FIG. 13, and also displays on the right hand side of the screen a fast-forward button E that is operated when issuing an instruction for a fast-forward feed and a fast-rewind button F that is operated when issuing an instruction for a rewind.

In step S46, the control unit 34 makes a decision as to whether or not the start/stop button 8 has-been pressed. If it is decided that the start/stop button 8 has not been pressed, the operation proceeds to step S47. In step S47, the control unit 34 makes a decision as to whether or not the fast-forward button E or the fast-rewind button F displayed on the LCD 5 has been operated (touched). If it is decided that neither the fast-forward button E nor the fast-rewind button F has been touched, the operation proceeds to step S48.

In step S48, the control unit 34 makes a decision as to whether or not the power/reset button 12 has been pressed. If it is decided that the power/reset button 12 has not been pressed, the operation proceeds to step S49. In step S49, the control unit 34 makes a decision as to whether or not the image that is currently being reproduced is at the reproduction end position which is predetermined in correspondence to the reproduction mode. If it is decided that the image is at the reproduction end position, the operation proceeds to step S50. In step S50, the reproduction end processing for the management of the reproduced file (to be detailed later) is executed.

If it is decided in step S48 that the power/reset button 12 has been pressed, the operation skips step S49. If it is decided in step S49 that the image is not at the reproduction end position, the operation returns to step S46.

If it is decided in step S47 that either the fast-forward button E or the fast-rewind button F has been touched, the operation proceeds to step S51. In step S51, the control unit 34 suspends the processing for a specific length of time (e.g., 0.2 seconds) after the fast-forward button E or the fast-rewind button F has been touched in order to avoid an operational error by the user.

In step S52, the control unit 34 makes a decision as to whether or not either the fast-forward button E or the fast-rewind button F is being touched. In step S53, through the control implemented by the control unit 34, a fast-forwarding or rewinding image is displayed on the LCD 5.

In step S54, the control unit 34 makes a decision as to whether or not the fast-forward button E or the fast rewind button F has been touched. If it is decided that either the fast-forward button E or the fast-rewind button F has been touched, the operation proceeds to step S55. If, on the other hand, it is judged that neither the fast-forward button E nor the fast-rewind button F has been touched, the processing enters a standby state until either the button E or the button F is touched. Namely, the fast-forward or the rewind is continued.

Figure 14:
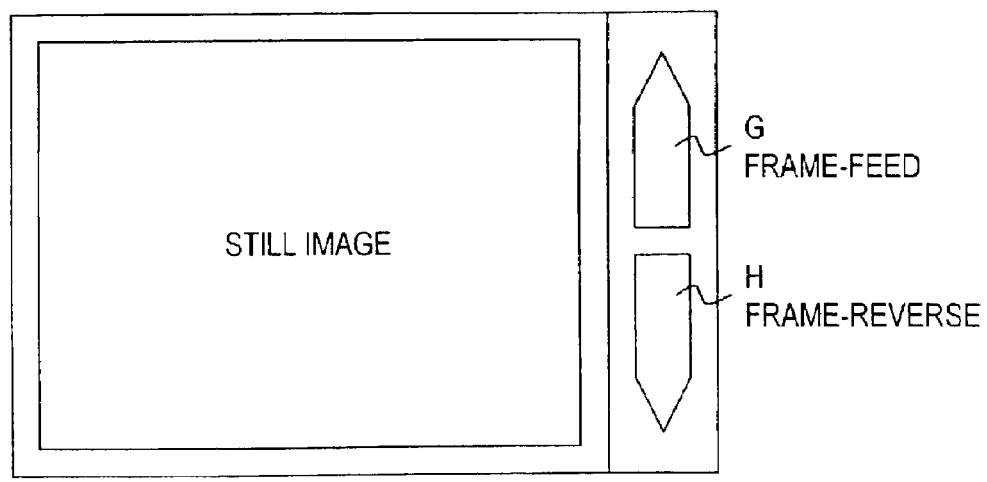
FIG. 14 illustrates an image displayed on the LCD 5 in FIG. 2.

In step S55, the control unit 34 ends the fast-forward or the rewind to start normal reproduction. If it is decided in step S46 that the start/stop button 8 has been pressed, the operation proceeds to step S56. In step S56, a still image is displayed at the center of the LCD 5 and a frame feed button G, which is operated when issuing an instruction for a frame feed and a frame reverse button H, which is operated when issuing an instruction for a frame reverse are displayed on the right hand side of the screen as illustrated in FIG. 14 through the control implemented by the control unit 34.

In step S57, the control unit 34 makes a decision as to whether or not the frame feed button G or the frame reverse button H displayed on the LCD 5 has been touched. If it is decided that either the frame feed button G or the frame reverse button H has been touched, the operation proceeds to step S58. In step S58, a frame feed or frame reverse image is displayed on the LCD 5 through the control implemented by the control unit 34.

In step S59, the control unit 34 makes a decision as to whether or not the start/stop button 8 has been pressed. If it is decided that the start/stop button 8 has been pressed, the operation proceeds to step S60. In step S60, a dynamic image that has been reproduced in the normal manner is displayed on the LCD 5 through the control implemented by the control unit 34.

If it is decided in step S57 that neither the frame feed button G nor the frame reverse button H has been touched, the operation skips step S58. If it is decided in step S59 that the start/stop button 8 has not been pressed, the operation returns to step S57.

The following advantages are achieved by implementing the reproduction processing in FIG. 12.

(1) By implementing reproduction in the reproduction mode No. 2 or the reproduction mode No. 3, dynamic images can be reproduced through sequential reproduction as in reproduction of dynamic image data recorded on magnetic tape. In addition, by implementing reproduction in the reproduction mode No. 1, dynamic images can be reproduced through random reproduction whereby dynamic image data that the user wishes to view can be reproduced in an instant. As a result, the operability of the reproduction procedure can be improved.

(2) Since the operation is switched to the reproduction mode when starting power supply through an operation of the start/stop button 8 (step 46), the operability is improved.

(3) With the operation in which the reproduction of dynamic images is momentarily paused (step S46), the dynamic image reproduction mode is changed to the still image reproduction mode in an instant, so that the operability is improved.

(4) As illustrated in FIG. 10, the length of remaining power supply time of the battery 38 is compared with the remaining recording time of the magneto-optical disk 10 to change the method for displaying time information in correspondence to the results of the comparison, and consequently, the right type of information is displayed for the user. In particular, by displaying the remaining power supply time flashing when the remaining recording time is longer than the remaining power supply time, good visual representation is achieved.

(5) Since the operating position in the dynamic image reproduction mode and the operating position in the still image reproduction mode are the same, as illustrated in FIGS. 13 and 14, an improvement in operability is achieved.

-Reproduction End Processing-

Figure 15:
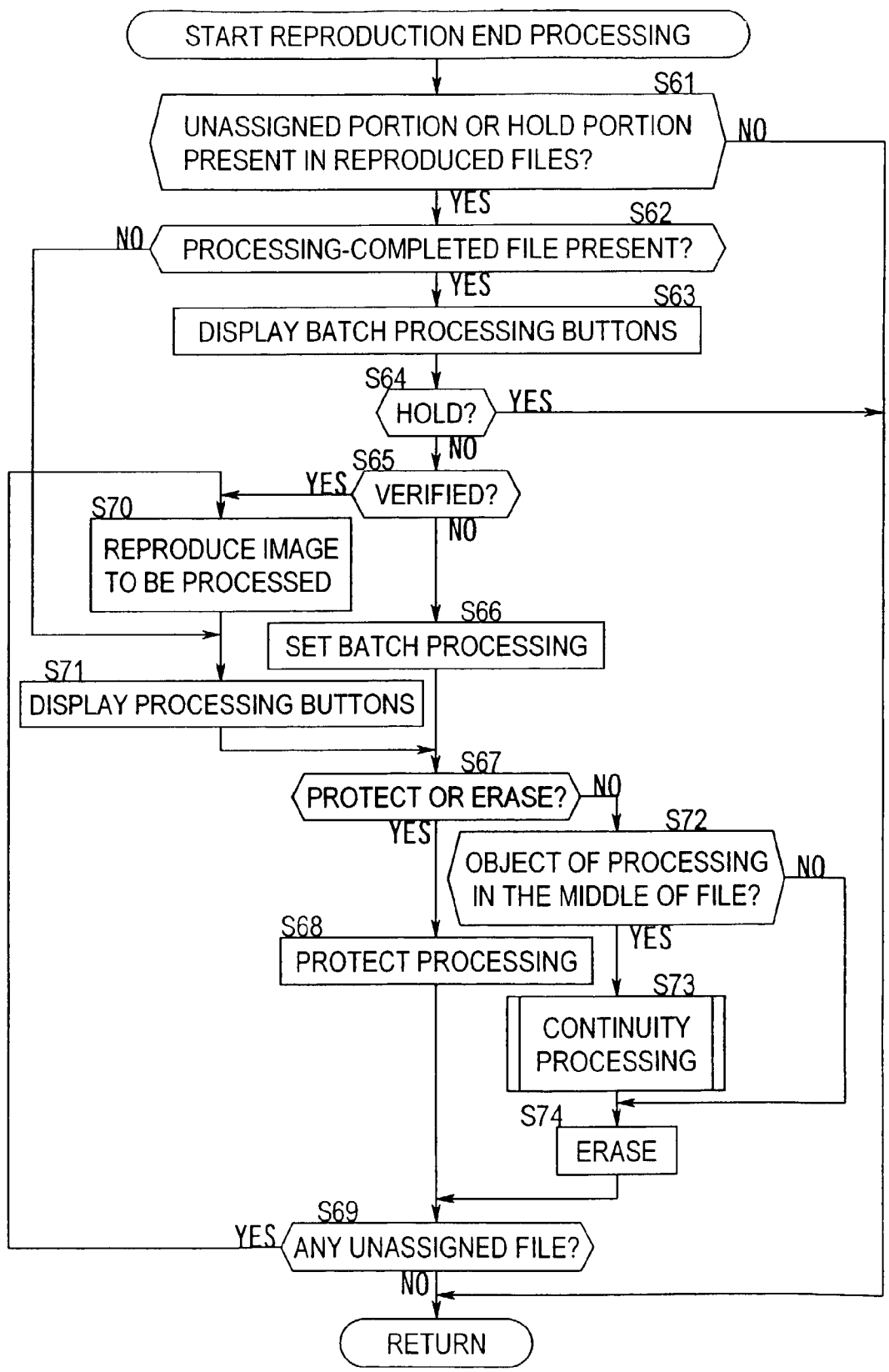
FIG. 15 is a flowchart illustrating the reproduction end processing in the video camera in FIG. 1.

The reproduction end processing performed in step S50 is now explained in reference to the flowchart in FIG. 15. In the reproduction end processing, files in which image information that has been reproduced in or before step S50 is stored are classified as protect, erase, hold or unassigned in conformance with an instruction issued by the user. Files that are to be stored come under the protect classification into which files that can be read but cannot be erased are classified. Files that are to be erased come under the erasure classification into which files that can be overwritten are classified. Files that have been put on hold without being classified for protect or erase come under the hold classification. Files that are not classified for protect, erase or hold come under the unassigned classification and files that are to undergo reproduction end processing for the first time are classified as unassigned.

In step S61, the control unit 34 makes a decision as to whether or not there are any unassigned or hold files among the files of images that have been reproduced in or before step S50. If it is decided that there are unassigned or hold files, the operation proceeds to step S62.

In step S62, the control unit 34 makes a decision as to whether or not there are any processing-completed files (protect, erase) or hold files mixed among the files of the images that have been reproduced in or before step S50. If it is decided that there is a processing-completed file mixed among them, the operation proceeds to step S63.

Figure 16:
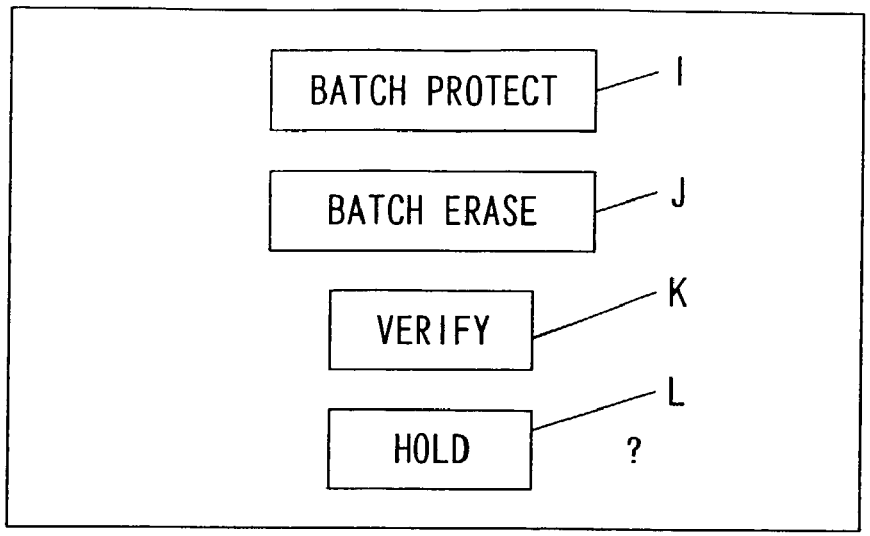
FIG. 16 illustrates an image displayed on the LCD 5 in FIG. 2.

In step S63, the control unit 34 implements control on the LCD 5 to display a batch protect button I, a batch erase button J, a verification button K and a hold button L as illustrated in FIG. 16. The batch protect button I is operated when classifying hold files and unassigned files among reproduced files as protect in a batch. The batch erase button J is operated when classifying hold files and unassigned files among the reproduced files as erase in a batch. The verification button K is operated when reproducing an image reproduced in or before step S50 again. The hold button L is operated when classifying reproduced unassigned files as hold.

In step S64, the control unit 34 makes a decision as to whether or not the hold button L has been pressed. If it is decided that the hold button L has not been pressed, the operation proceeds to step S65. In step S65, the control unit 34 makes a decision as to whether or not the verification button K has been pressed. If it is decided that the verification button K has not been pressed, the operation proceeds to step S66. In step S66, the control unit 34 sets all the hold files and unassigned files as objects for processing.

In step S67, the control unit 34 makes a decision as to whether or not any of the protect or erase buttons has been pressed. If it is decided that either the batch protect button I or a protect button M (to be detailed later) has been pressed, the operation proceeds to step S68. In step S68, the control unit 34 classifies the files being processed as protect. In other words, the attribute of the corresponding files is defined as read-only.

In step S69, the control unit 34 makes a decision as to whether or not there is any unassigned file among the files in which an image that has been reproduced in or before step S50 is stored. If it is decided that there is no unassigned file present, the control unit 30 causes the LCD 5 to display the initial screen (see FIG. 5) before making a return.

If it is decided in step S65 that the verification button K has been pressed, the operation proceeds to step S70. In step S70, any unassigned file among the images that have been reproduced in or before step S50 are reproduced as an object of processing through control implemented by the control unit 34 and are displayed on the LCD 5.

Figure 17:
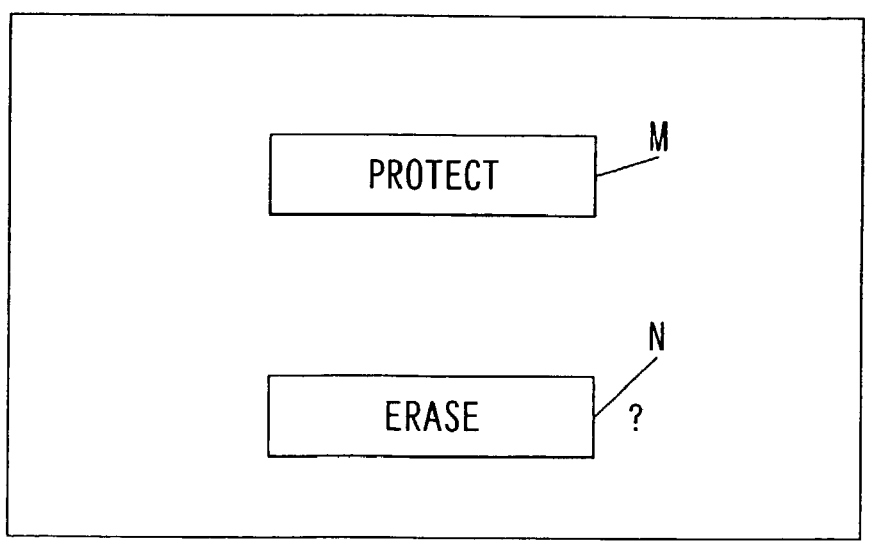
FIG. 17 illustrates an image displayed on the LCD 5 in FIG. 2.

In step S71, the control unit 34 implements control to cause the LCD 5 to display the protect button M and an erase button N, as illustrated in FIG. 17. The protect button M is operated when classifying a file that is the object for processing as protect. The erase button N is operated when classifying a file that is the object of processing as erase.

If it is decided in step S67 that either the batch erase button J or the erase button N has been pressed, the operation proceeds to step S72. In step S72, the control unit 34 makes a decision as to whether or not the image that has been reproduced in step S70 is in the middle of the file. If it is decided that the image reproduced in step S70 is in the middle of the file, the operation proceeds to step S73. In step S73, the continuity processing (to be detailed later) is executed. In step S74, the file that is the object of processing is placed in the erase classification. In other words, the relevant file is moved into the erase directory.

If it is decided in step S61 that there are no assigned files or hold files, a return is made. If it is decided in step S62 that there are no processing-completed files mixed in, the operation proceeds to step S71. If it is decided that in step S64 that the hold button L has been pressed, a return is made. If it is decided that in step S72 that the image reproduced in step S70 is not in the middle of the file, the operation skips step S73.

By implementing the reproduction end processing illustrated in FIG. 15, in which an inquiry is made of the user with respect to a specific type of processing to be performed on reproduced dynamic image data, e.g., with respect to whether the file is to be protected or erased after the dynamic image data are reproduced, there is no risk of a specific type of processing being performed on the wrong dynamic image data by mistake and an improvement in operability is achieved during an erase operation.

-Erase/Edit Processing-

Figure 18:
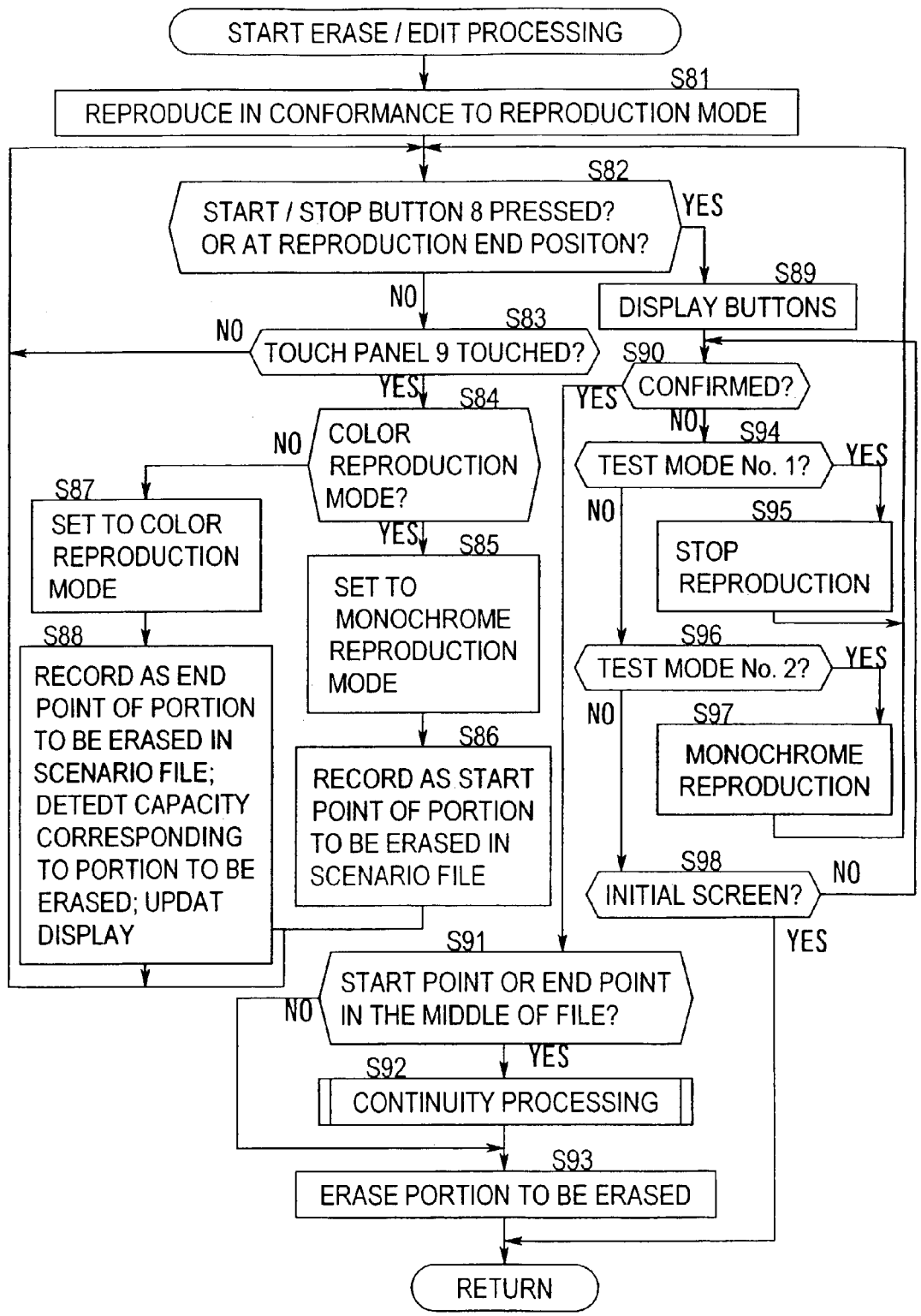
FIG. 18 is a flowchart illustrating the erase/edit processing in the video camera in FIG. 1.
Figure 19:
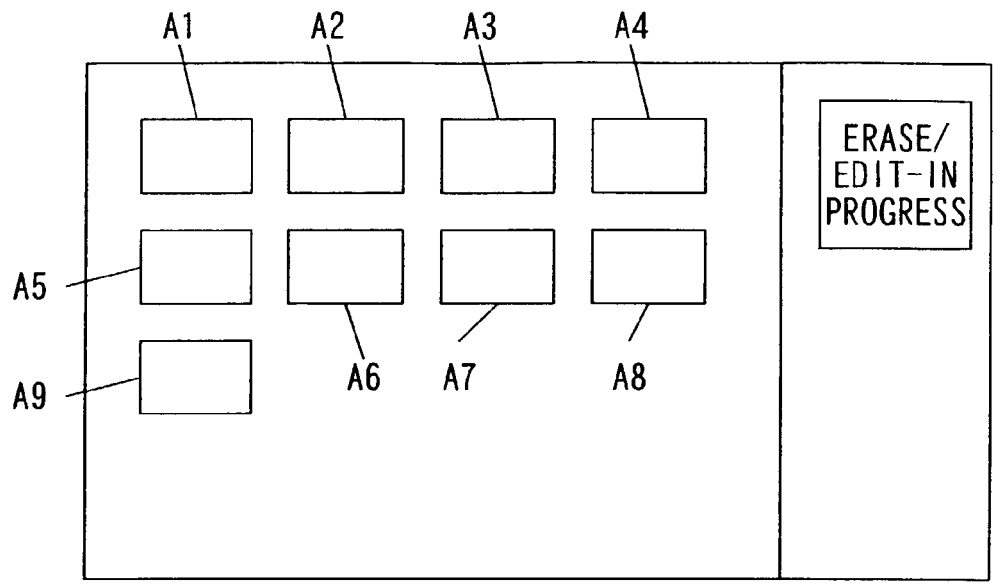
FIG. 19 illustrates an image displayed on the LCD 5 in FIG. 2.
Figure 23:
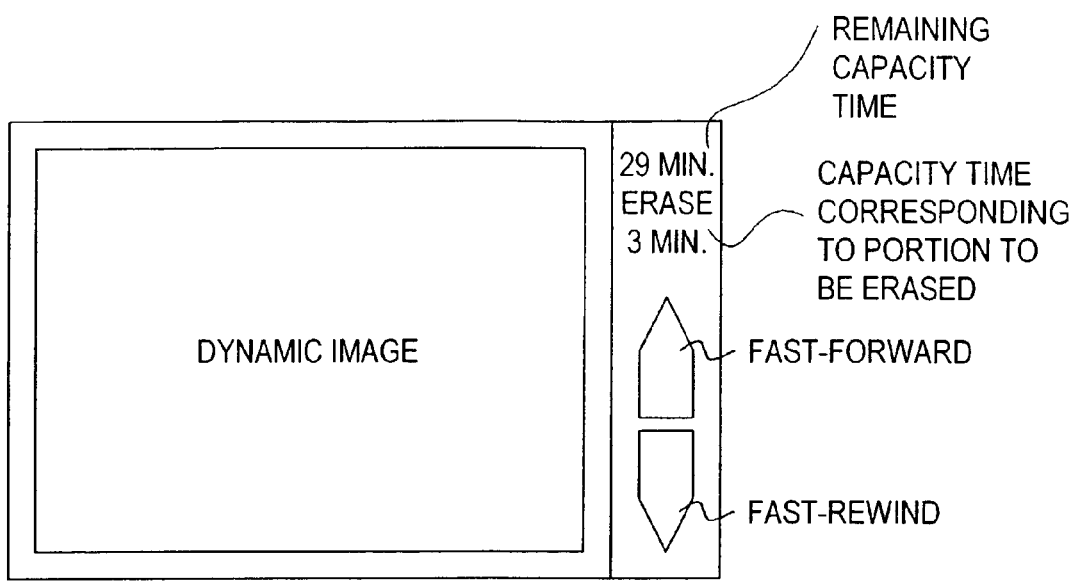
FIG. 23 illustrates an image displayed on the LCD 5 in FIG. 2.

FIG. 18 is a flowchart illustrating the erase/edit processing performed in the video camera. In step S81, the control unit 34 causes the LCD 5 to display thumbnail images A1~A9 at the center of the LCD 5 and also causes the LCD 5 to display "erase/edit is in progress" on the right hand side of the screen, as illustrated in FIG. 19. At this point, the user executes an operation similar to the operation for starting the reproduction processing explained earlier (see steps S41~S44 in FIG. 12). In response to the operation by the user, the control unit 34 causes image information to be read out from the magneto-optical disk 10 for reproduction and causes the LCD 5 to display the image. At this time, the control unit 34 controls the LCD 5 to display the remaining capacity time at the magneto-optical disk 10 and the capacity time correspondence to the portion to be erased, as illustrated in FIG. 23, instead of bringing up the display for normal reproduction (see FIG. 13). Thus, the user can ascertain how much capacity (time) is secured, i.e., how much capacity will be gained by erasing the portion to be erased. In addition, the user can ascertain that an erase/edit is in progress, as well. The portion to be erased will be detailed later.

In step S82, the control unit 34 makes a decision as to whether or not the start/stop button 8 has been pressed or as to whether or not the image that is being reproduced is at the reproduction end position. If it is decided that the start/stop button 8 has not been pressed and that the image that is being reproduced is not at the reproduction end position, the operation proceeds to step S83.

In step S83, the control unit 34 makes a decision as to whether or not the dynamic image display area at the touch panel 9, which is provided on top of the LCD 5 on which the dynamic image is displayed, has been touched. If it is decided that the touch panel 9 has been touched, the operation proceeds to step S84. This decision-making is implemented based upon whether or not the start point or the end point of the portion to be erased in the displayed image has been specified.

In step S84, the control unit 34 makes a decision as to whether or not the image on the LCD 5 is being reproduced in color reproduction mode. In this context, the color reproduction mode refers to a mode for reproducing images for which an erase specification has not been made, in which the reproduced images are displayed in color on the LCD 5. If it is decided that the LCD 5 is in the color reproduction mode, i.e., if it is decided that the image that is on display does not constitute a portion to be erased, the operation proceeds to step S85.

In step S85, the control unit 34 switches from color reproduction mode to monochrome reproduction mode to switch the reproduced image on the LCD 5 from color display to monochrome display. In this context, the monochrome reproduction mode refers to a mode for reproducing images specified for erase, in which reproduced images are displayed on the LCD 5 in monochrome.

In step S86, the control unit 34 records the timing with which the touch panel 9 has been touched in step S83 as the start point of the portion to be erased in a scenario file. The scenario file is a work record file which is to be referenced when executing an erase.

If it is decided in step S84 that the monochrome reproduction mode is set, i.e., if it is decided that the image on display constitutes a portion to be erased, the operation proceeds to step S87. In step S87, the control unit 34 switches the setting on the LCD 5 from monochrome display to color display.

In step S88, the control unit 34 records the time point one second before the timing with which the touch panel 9 has been touched in step S83 in the scenario file described earlier as the end point of the portion to be erased. By setting the time point one second before the timing with which the touch panel 9 is touched as the end point of the portion to be erased, it becomes possible to prevent the portion to be erased from becoming excessively long due to a delay in the operation by the user. In addition, the control unit 34 detects the capacity time corresponding to the portion to be erased and updates the display of the capacity corresponding to the portion to be erased illustrated in FIG. 23.

If it is decided in step S83 that the touch panel 9 has not been touched, the operation returns to step S82. If it is decided in step S82 that the start/stop button 8 has been pressed or that the image that is being reproduced is at the reproduction end position, the operation proceeds to step S89.

Figure 20:
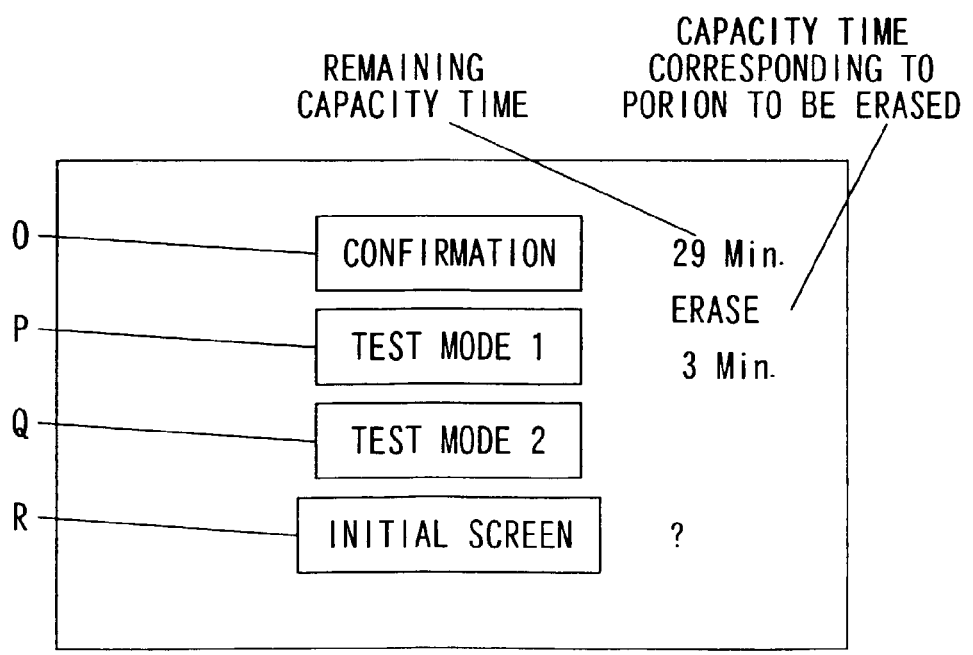
FIG. 20 illustrates an image displayed on the LCD 5 in FIG. 2.

In step S89, the control unit 34 causes the LCD 5 to display a confirmation button O that is operated when issuing an instruction to erase the portion to be erased, a test mode No. 1 button P that is operated when images are reproduced by skipping the portion to be erased, a test mode No. 2 button Q that is operated when displaying the portion to be erased in monochrome and displaying portions that are not to be erased in color and an initial screen button R that is operated when returning to the initial screen (see FIG. 5), as illustrated in FIG. 20.

In step S90, the control unit 34 makes a decision as to whether or not the confirmation button O has been touched. If it is decided that the confirmation button O has been touched, the operation proceeds to step S91. In step S91, the control unit 34 makes a decision as to whether or not the start point or the end point of the portion to be erased is located in the middle of the file. If it is decided that either the start point or the end point of the portion to be erased is located in the middle of the file, the operation proceeds to step S92. In step S92, the continuity processing of the files containing the portion to be erased is executed.

-Continuity Processing-

Now, the continuity processing is explained. As described above, image information is stored in files after it is compressed through the MPEG method in the embodiment. In MPEG compression, the quantity of information is compressed by using the image information on a reference frame used as a reference and recording differential information between the image information on the reference frame and image information on a specific number of frames succeeding the reference frame as the image information for the specific number of frames. Thus, when dividing a file into two portions at an arbitrary position (frame) as the boundary for the division in order to, for instance, erase the first half of the file and if a frame located in the first half of the file is used as the reference frame for frames near the beginning of the remaining second half (to be stored), it is necessary to record the information on the reference frame in the second half of the file. This processing is referred to as the continuity processing. Details of the continuity processing are now explained using the example illustrated in FIG. 8B and in reference to the flowchart in FIG. 21.

In step S101, the control unit 34 references the scenario file and extracts a sequence of scenes including the files containing the portion to be erased to set it as the object of processing. For instance, in the example illustrated in FIG. 8B, the scene 3 is extracted since the portion to be erased is present over the files FL7~FL9.

In step S102, the control unit 34 extracts a file in which the portion to be erased is present. In this example, the file FL7 is extracted because the start point of the portion to be erased is in the file FL7. In step 103, the control unit 34 extracts the portion that is not to be erased in the file that has been extracted in step S102. In the example, the file FL7a is extracted after the file FL7, which has a plurality of frames, has been divided into a no-erased file FL7a and an erased file FL7b. The erased file FL7b exists between the start point and end point of the portion to be erased.

In step S104, the control unit 34 makes a decision as to whether or not the portion that is not to be erased extracted in step S103 is at the beginning of the file. In the example, since the file FL7a is at the beginning of the file, the operation proceeds to step S105. In step S105, the control unit 34 copies the file FL7a extracted in step S103 in the buffer memory 26.

In step S106, the control unit 34 executes termination processing for the file FL7a that has been copied in the buffer memory 26, i.e., the control unit 34 executes a write of the EOF. In step S107, the control unit 34 implements control on the data access unit 27 to record the file FL7a that has undergone the termination processing in the magneto-optical disk 10, as illustrated in FIG. 8C. In step S108, the control unit 34 implements control on the data access unit 27 to enter the file name of file FL7b in the "succeeding file" field of the header portion of the file FL7a.

In step S109, the control unit 34 makes a decision as to whether or not the portion not to be erased is remaining in the file extracted in step S102 Since no portion not to be erased is remaining in the file FL7, the operation proceeds to step S110. In step S110, the control unit 34 makes a decision as to whether or not any file in which the start point or the end point of the portion not to be erased is present is remaining among the sequence of files extracted in step S101. Since the file FL9 is still present in the case of this example, the operation returns to step S102. The file FL9 is extracted in step S102.

After the file FL9, which has a plurality of frames, has been divided into an erased file FL9a and a no-erased file FL9b, the file FL9b is extracted in step S103. In step S104, it is decided that the file FL9b does not constitute the beginning of the file and the operation proceeds to step S112. In step S112, the control unit 34 causes the file FL9 extracted in step S102 to be copied in the buffer memory 26.

In step S113, the control unit 34 implements control on the data compression/expansion unit 25 to expand the file FL9. In step S114, the control unit 34 implements control of the data compression/expansion unit 25 to perform MPEG compression on the file FL9b constituting the portion not to be erased extracted from the file FL9. In step S115, the control unit 34 implements control of the data access unit 27 to record the file FL 9b that has undergone MPEG compression in the magneto-optical disk 10.

In step S108, the control unit 34 implements control of the access unit 27 to enter data indicating the file FL 7a in the "preceding file" field and indicating the file FL10 in the "succeeding file" field of the header portion of the file FL9b.

Since it is decided in step 109 that no portion not to be erased remains in the file FL9, the operation proceeds to step S110. In step S110, it is decided that no file in which the start point or the end point of the portion not to be erased is present remains in the sequence of files extracted in step S101 and the operation proceeds to step S111. In step S111, a decision is made as to whether or not a sequence of scenes containing a file with the portion to be erased is present. Since such a file is not present in this example, a return is made.

-Subsequent Erase/Edit Processing-

Now the explanation is given again in reference to FIG. 18. In step S93, the control unit 34 implements control of the data access unit 27 to erase the portion to be erased (the files FL7b, FL8 and FL9a in the example presented in FIG. 8B). In other words, the relevant files are stored in the erase directory. If it is decided in step S91 that neither the start point nor the end point of the portion to be erased is present in the middle of the file, the operation skips step S92.

If it is decided in step S90 that the confirmation button O has not been touched, the operation proceeds to step S94. In step S94, the control unit 34 makes a decision as to whether or not the test mode No. 1 button P has been touched. If it is decided the test mode No. 1 button P has been touched, the operation proceeds to step S95. In step S95, the control unit 34 reproduces the scenes specified in step S81 by skipping the portion to be erased and displays them on the LCD 5.

If it is decided in step S94 that the test mode No. 1 button P has not been touched, the operation proceeds to step S96. In step S96, the control unit 34 makes a decision as to whether or not the test mode No. 2 button Q has been touched. If it is decided that the test mode No. 2 button Q has been touched, the operation proceeds to step S97. In step S97, the control unit 34 reproduces in monochrome the portion to be erased and reproduces in color the portion not to be erased among the scenes specified in step S81 and displays them on the LCD 5.

If it is decided in step S96 that the test mode No. 2 button Q has not been touched, the operation proceeds to step S98. In step S98, the control unit 34 makes a decision as to whether or not the initial screen button R has been touched. If it is decided that the initial screen button R has not been touched, the operation returns to step S90, whereas if it is decided that the initial screen button R has been touched, the initial screen (see FIG. 5) is displayed on the LCD 5.

Figure 8E:
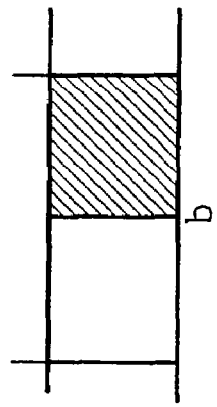
Figure 8F:
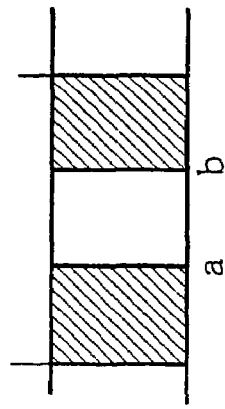
Figure 8G:
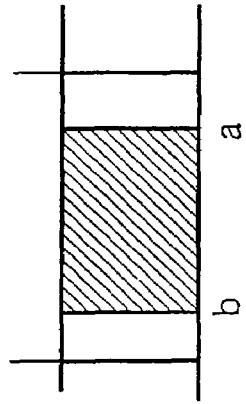

As explained above, through the erase/edit processing, any portion can be erased in the cases such as when the first half of a file FL, as illustrated in FIG. 8D constitutes the portion to be erased ("a" indicates the end point of the portion to be erased), when the second half of a file FL, as illustrated in FIG. 8E, constitutes the portion to be erased ("b" indicates the start point of the portion to be erased) and when FIG. 8D and FIG. 8E are combined in an arbitrary manner, as illustrated in FIGS. 8F and 8G.

The following advantages are achieved by implementing the erase/edit processing in FIG. 18.

(1) Since the editing range of dynamic images is specified when reproducing the dynamic images, the editing range can be set with ease.
(2) With the editing range and the non-editing range displayed differently, the editing range and the non-editing range can be distinguished from each other with ease.
(3) Since display is implemented by skipping the specified editing range, the state of the dynamic images after the edit operation can be verified before the edit is performed.

-Subsequent Startup Processing-

To continue with the explanation given in reference to FIG. 4, in step S7, the control unit 34 makes a decision as to whether or not the OFF button D has been touched. If it is decided that the OFF button D has been touched, the operation proceeds to step S8. In step S8, the control unit 34 turns off the drive power source for driving the video camera. However, the standby power sources for detecting any operation of the power/reset button 12 is in an ON state.

If it is decided in step S7 that the OFF button D has not been touched, the operation proceeds to step S9. In step S9, the control unit 34 makes a decision as to whether or not a specific length of time has elapsed since the initial screen was displayed in step S4. If it is decided that the specific length of time has elapsed, the operation proceeds to step S8, whereas if it is decided that the specific length of time has not elapsed, the operation returns to step S5.

FIG. 22 shows examples of the remaining capacity time which is determined through a fuzzy logic function in the remaining recording time display processing in FIG. 10. The remaining capacity time displayed in step S34 in FIG. 10 may be any one of the actual display minimum, the actual display maximum and the actual display average that are to be explained below.

In the elapsed time field in FIG. 22, the length of time that has elapsed since the recording start is displayed. In the assumed Min remaining time field, the remaining recording time when the storage capacity consumption quantity per unit time is assumed to be the Max value is displayed. In the assumed maximum remaining time field, the remaining recording time when the storage capacity consumption quantity per unit time is assumed to be the minimum value is displayed. In the actual remaining capacity field, the remaining capacity that is actually measured relative to the elapsed time at 0 minute is displayed. In the actual display minimum field, displayed is the remaining recording time when the storage capacity consumption quantity per unit time is assumed to be the maximum value and that corresponds to the actual remaining consumption capacity. It is to be noted that 8.6→9, for instance, indicates that the calculated value is 8.6 with 9 representing a value achieved by rounding off. In the actual display maximum field, displayed is the remaining recording time when the storage capacity consumption quantity per unit time is assumed to be the minimum value and that corresponds to the actual remaining consumption capacity. In the actual display average field, the average value of the actual display minimum and the actual display maximum is displayed.

It is to be noted that the computer program that directs the control unit 34 to execute the processing described above is stored in the storage unit 37. Alternatively, the computer program may be provided for the user in a state in which it is stored in the magneto-optical disk 10 in advance.

In addition, while the magneto-optical disk 10 is employed as the recording medium for recording compressed image information in this embodiment, another type of information recording medium that allows random access, e.g., a DVD, may be employed, instead.

The present invention may be implemented in the following modes as well.

Figure 21:
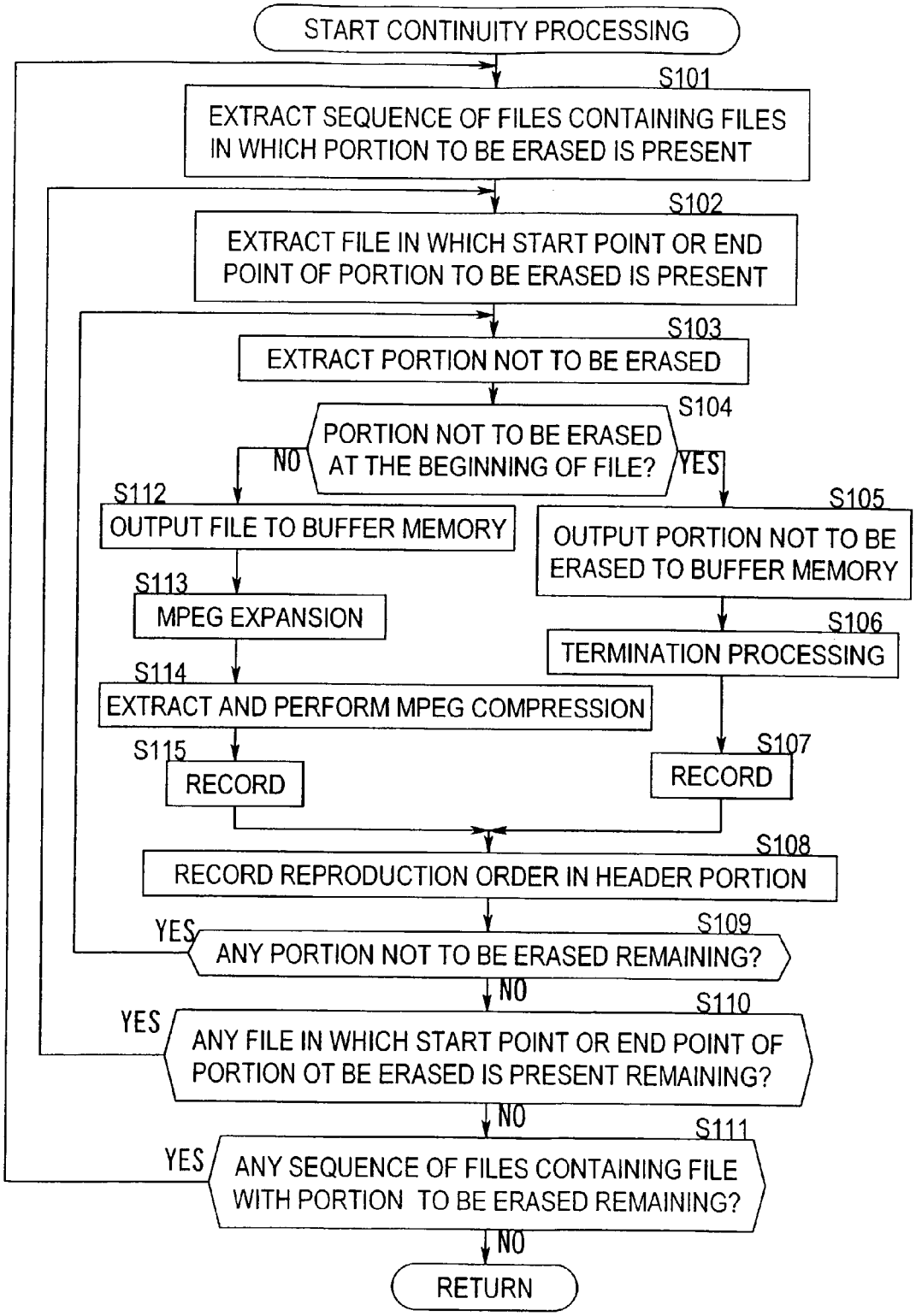
FIG. 21 is a flowchart illustrating the continuity processing in the video camera in FIG. 1.

(1) The remaining recording time display in FIG. 10 may be adopted not only in video cameras but also in all types of image recording apparatuses that are driven by a battery and record image data in an internal memory or in an external memory. Such image recording apparatuses include still cameras, portable information terminal apparatuses and personal computers.
(2) The method whereby dynamic images are divided for recording, as illustrated in FIGS. 6, 8 and 9 is not restricted to application in the recording of images captured by video cameras. For instance, the method may be adopted when dynamic images that are continuously recorded are taken into a personal computer to undergo image editing. Thus, the present invention may be adopted in an image processing apparatus that is not provided with a photographing device, such as a personal computer.
(3) The method of erase/edit processing implemented on dynamic images illustrated in FIGS. 18 and 21 is not restricted to application in editing with a video camera. For instance, it may be adopted when dynamic images are taken into a personal computer for erase/edit operations. As a result, the present invention may be adopted in an image processing apparatus that is not provided with a photographing device, such as a personal computer.
(4) The method of reproduction end processing implemented on dynamic images illustrated in FIG. 15 is not restricted to application in reproduction implemented using a video camera. For instance, it may be adopted when dynamic images are taken into a personal computer to undergo image reproduction. Thus, the present invention may be adopted in an image processing apparatus that is not provided with a photographing device, such as a personal computer.

(5) The method of reproduction processing implemented on dynamic images illustrated in FIG. 12 is not restricted to application in reproduction implemented using a video camera. For instance, it may be adopted when dynamic images are reproduced on a portable information terminal apparatus, a notebook type personal computer or the like. Furthermore, the present invention may be adopted when a photographing device is mounted on any of these apparatuses.

Second Embodiment

Figure 24:
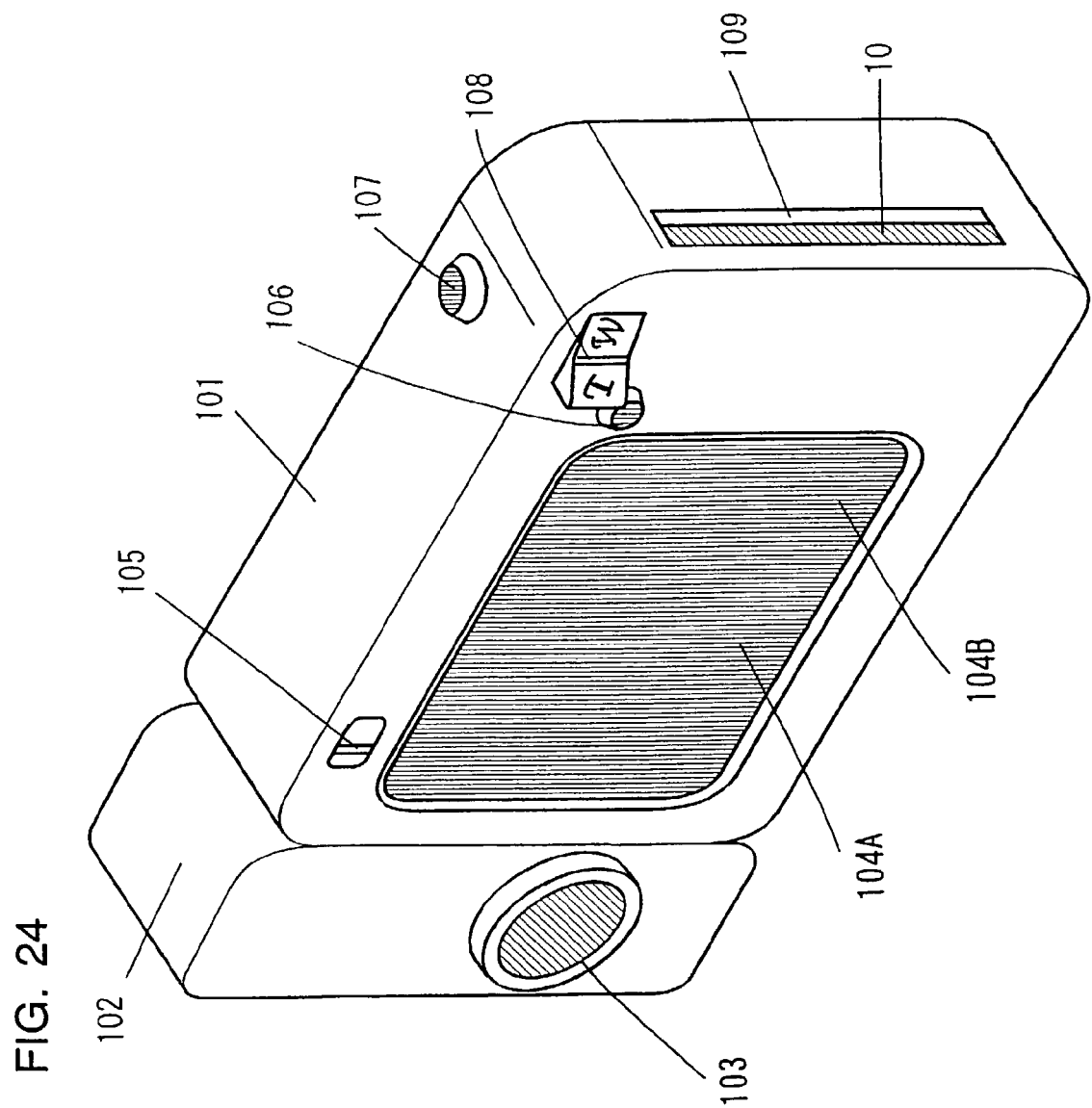
FIG. 24 is a perspective illustrating an example of the external structure of a movie camera adopting the information recording/reproduction apparatus according to the present invention.

FIG. 24 is a perspective illustrating the external structure of a movie camera employing the information recording/reproduction apparatus according to the present invention. At the front surface of a main body 101, a liquid crystal display unit 104A is provided, with a touch panel 104B that outputs a positional signal corresponding to the position specified through a user touch operation mounted on the front surface of the liquid crystal display unit 104A. The touch panel 104B is constituted of a transparent material such as glass or resin so that the user can see images displayed on the liquid crystal display unit 104A formed inside the touch panel 104B via the touch panel 104B.

In addition, at the front surface of the main body 101, a power switch (main switch) 105, a dynamic image record button 106 for issuing an instruction for a start of dynamic image recording and a zoom button 108 which is operated when switching the zoom setting, are provided. At the upper surface of the main body 101, a still image record button 107 for issuing an instruction for a start of still image recording is provided. It is to be noted that the dynamic image record button 106 and the still image record button 107 are collectively referred to as the trigger buttons, as necessary. At a side surface (the right side surface in the figure) of the main body 101, a slot 9 where a magneto-optical recording medium 10 that can be inserted and ejected freely, such as an MO (magneto-optical) disk, is loaded, is provided. It is to be noted that when the magneto-optical recording medium 10 is loaded while power is in an off state, the power is turn on.

In addition, a camera unit 102 is rotatably mounted at the main body 101, and the camera unit 102 can be secured at any position over the 360° range. Thus, the user can photograph from various angles while monitoring the subject displayed on the liquid crystal display unit 104A.

Figure 25:
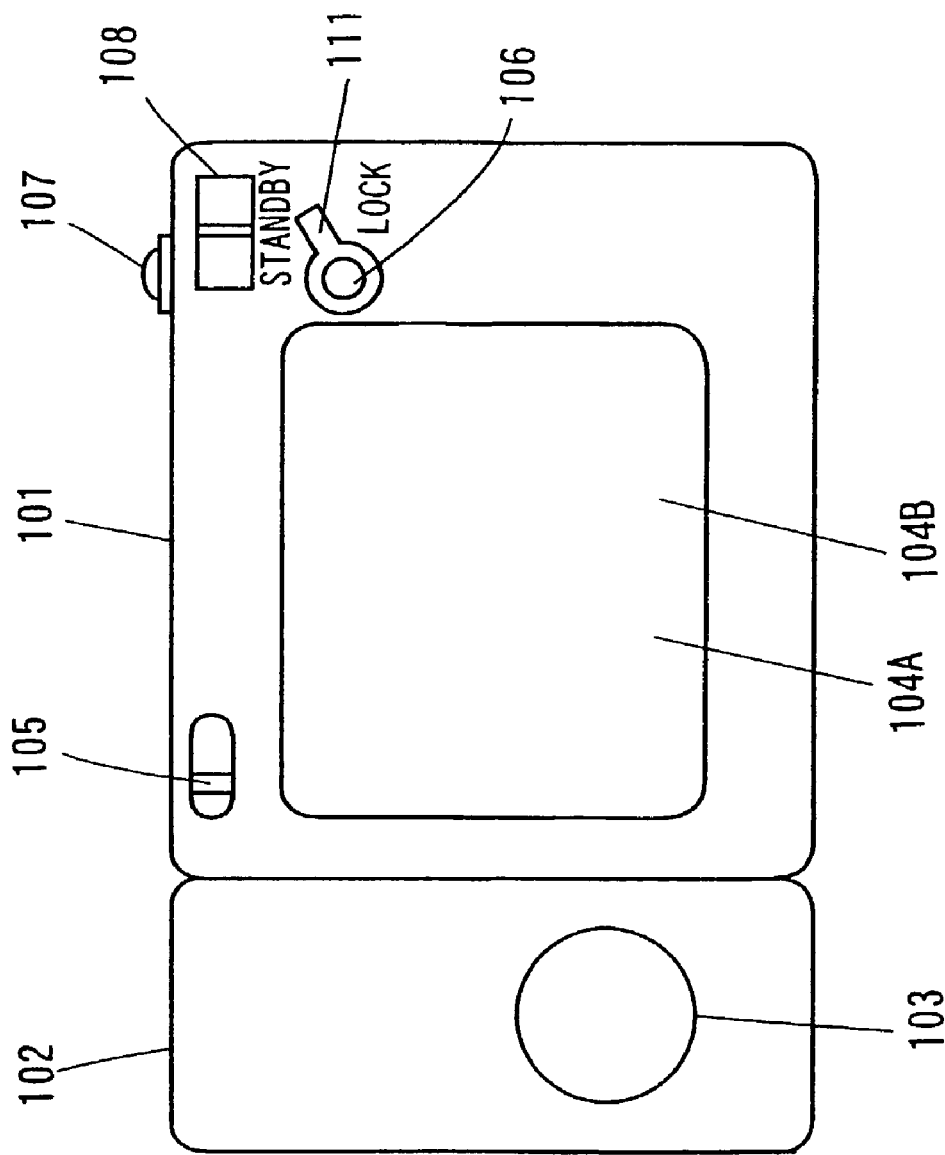
FIG. 25 presents a structural example in which a selector switch 111 is provided in the movie camera in FIG. 24.

It is to be noted that, as illustrated in FIG. 25, a selector switch 111 for switching between a state in which the dynamic image record button 106 can be operated and a state in which it cannot be operated may be provided at the main body 101. In this example, when the lever of the selector switch 111 is switched to the "standby" position, an operation of the dynamic image record button 106 is validated, i.e., the operation of the dynamic image record button 106 is accepted, whereas when the lever is switched to the "lock (trigger lock)" position, any operation of the dynamic image record button 106 is invalidated, i.e., the operation is not accepted. This prevents any erroneous operation from occurring when the dynamic image record button 106 is inadvertently operated.

Figure 26:
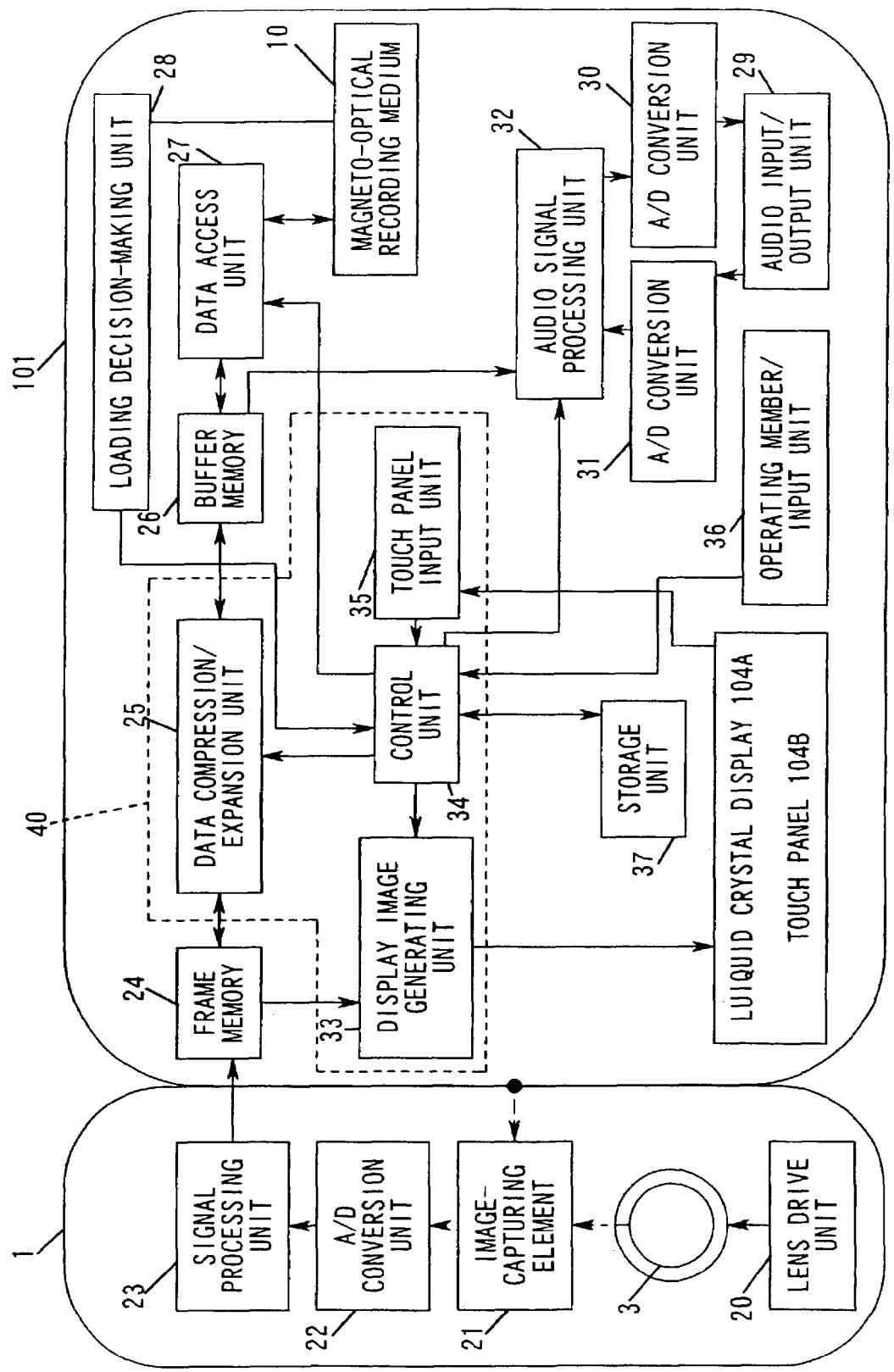
FIG. 26 is a block diagram illustrating an example of the electrical structure of the movie camera in FIG. 24.

FIG. 26 is a block diagram illustrating an example of the internal electrical structure of the movie camera in FIG. 24. FIG. 26 is similar to FIG. 3 illustrating the first embodiment, and the same reference numbers are assigned to similar components to preclude the necessity for repeated explanation thereof. In a storage unit 37, data, programs and the like that are required for the execution of various types of processing by a control unit 34 are recorded as necessary, and the mode that has been executed (the photographing mode, the disk operation mode or both) when power is turned off is stored in the storage unit 37 as well. Then when power is turned on, the control unit 34 sets a mode in correspondence to the memory contents in the storage unit 37.

-Movie Camera Operation Processing-

Figure 27:
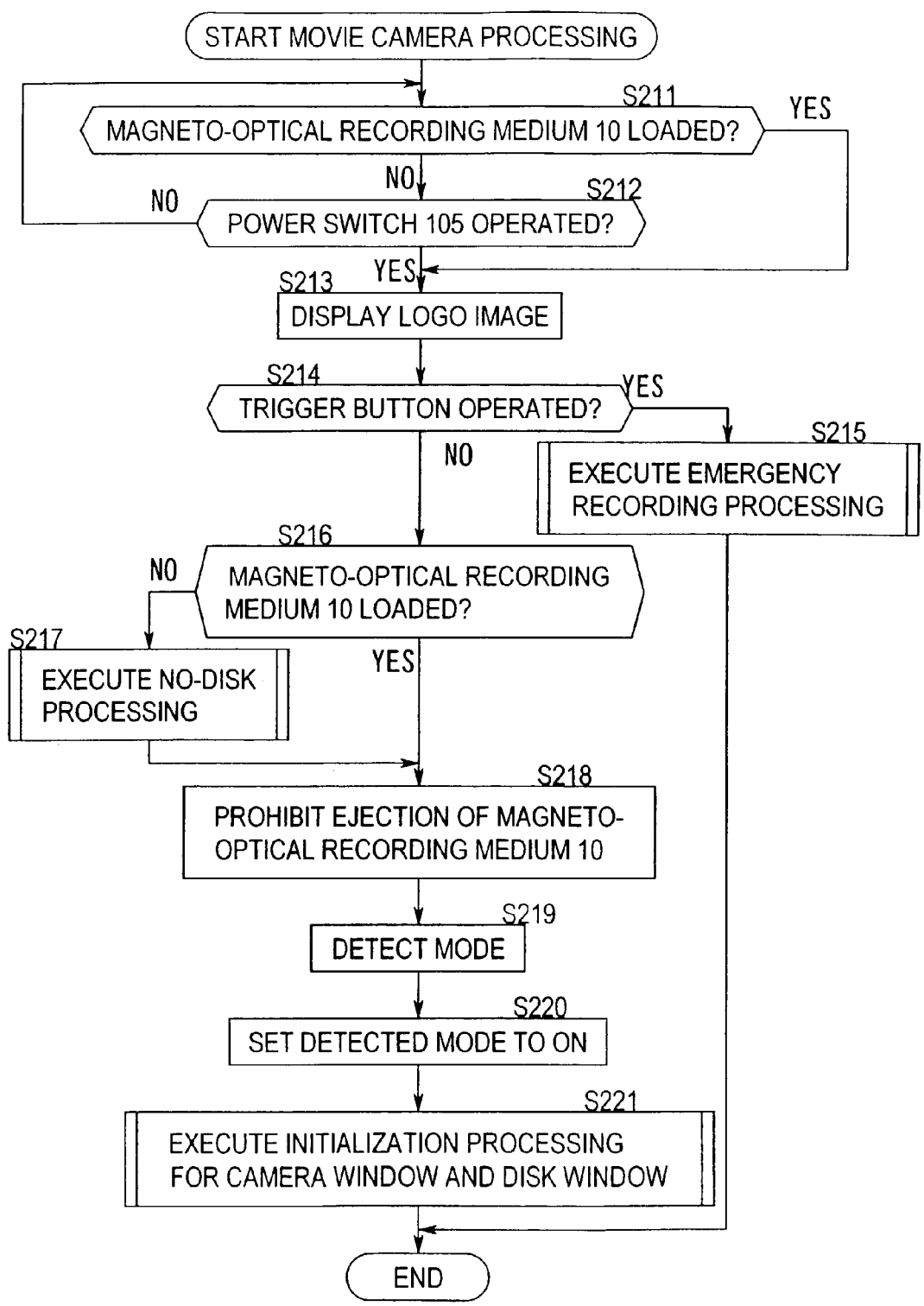
FIG. 27 is a flowchart illustrating the operation performed by the movie camera.

Next, in reference to FIG. 27, the operation of the movie camera in FIG. 26 is explained. First, in step S211, a decision is made as to whether or not a magneto-optical recording medium 10 has been loaded. If it is decided that the magneto-optical recording medium 10 has been loaded, the operation proceeds to step S213. In other words, this turns the power on. If it is decided in step S211 that no-magneto-optical recording medium 10 has been loaded, the operation proceeds to step S212 to make a decision as to whether or not the power switch 105 has been operated. If it is decided in step S212 that the power switch 105 has not been operated, the operation returns to step S211 to execute subsequent processing.

Figure 28:
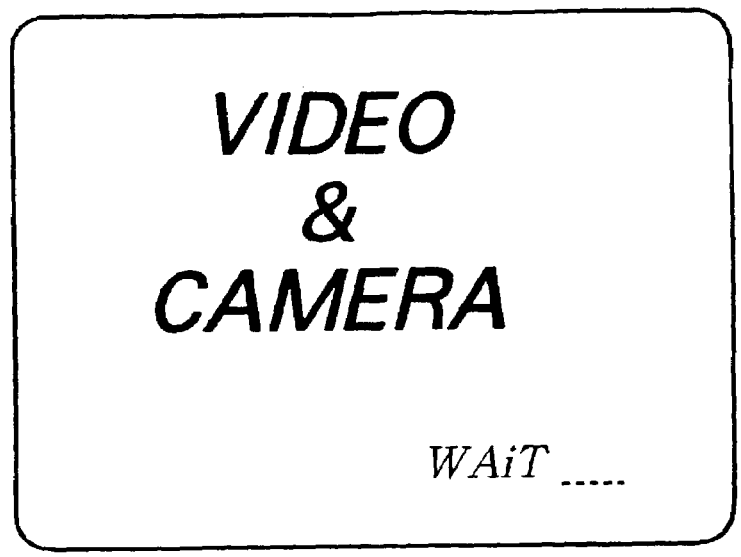
FIG. 28 presents a display example of a logo image.

If, on the other hand, it is decided in step S212 that the power switch 105 has been operated, the operation proceeds to step S213, in which the control unit 34 implements control on the display image generating unit 33 to display a logo image (initial image) stored in the storage unit 37 on the liquid crystal display 104A. FIG. 28 presents an example of a logo image that may be displayed at this point. In step S214, the control unit 34 makes a decision as to whether or not a trigger button (either the dynamic image record button 106 or the still image record button 107) has been operated, and if it is decided that a trigger button has been operated, the operation proceeds to step S215 to execute the emergency recording processing (to be detailed later in reference to FIG. 30).

If it is decided in step S214 that no trigger button has been operated, the operation proceeds to step S216 to make a decision as to whether or not a magneto-optical recording medium 10 has been loaded. If it is decided in step S216 that no-magneto-optical recording medium 10 has been loaded, the operation proceeds to step S217 to execute the no-disk processing, i.e., the no-magneto-optical medium processing before proceeding to step S218. The no-magneto-optical recording medium processing is to be detail later in reference to FIG. 32. If it is decided in step S216 that the magneto-optical recording medium 10 has been loaded, the operation proceeds to step S218 to prohibit ejection of the magneto-optical recording medium 10. In step S218, the control unit 34 detects the mode stored in the storage unit 37, i.e., either the photographing mode or the disk operation mode.

In step S220, the control unit 34 sets the detected mode to ON, i.e., the control unit 34 starts up the detected mode, and in step S221, it initializes the camera window and disk window. It is to be noted that if it is not clear which mode has been previously set, the control unit 34 sets both the photographing mode and the disk operation mode to ON.

Figure 29:
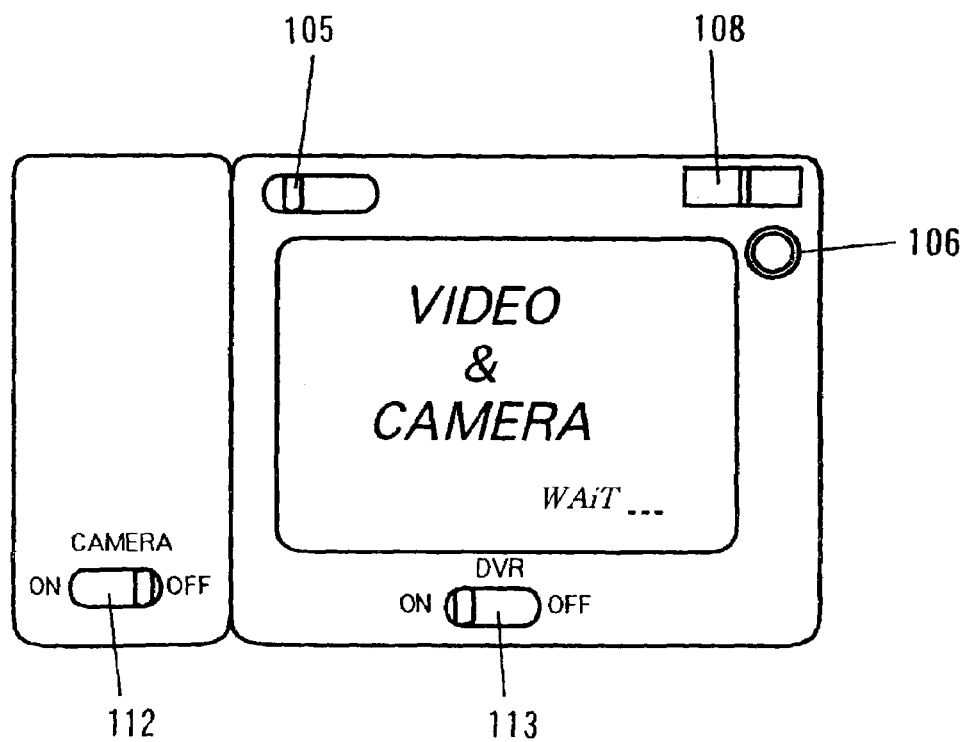
FIG. 29 presents a structural example in which a photographing mode switch 112 and a disk operation mode switch 113 are provided in the movie camera.

For the purpose of mode detection implemented in this process, a switch (CAMERA switch) 112 corresponding to the photographing mode and a switch (DVR switch) 113 corresponding to the disk operation mode, for instance, may be provided at the movie camera, as illustrated in FIG. 29. With this structure, the corresponding mode can be turned on or off depending upon whether or not the switches are in an on or off state. In addition, the photographing mode may be set to ON without fail whenever the lever of the selector switch 111 illustrated in FIG. 25, for instance, is at the standby position. Details of this point are explained later in reference to FIG. 40.

-Emergency Recording Processing-

Figure 30:
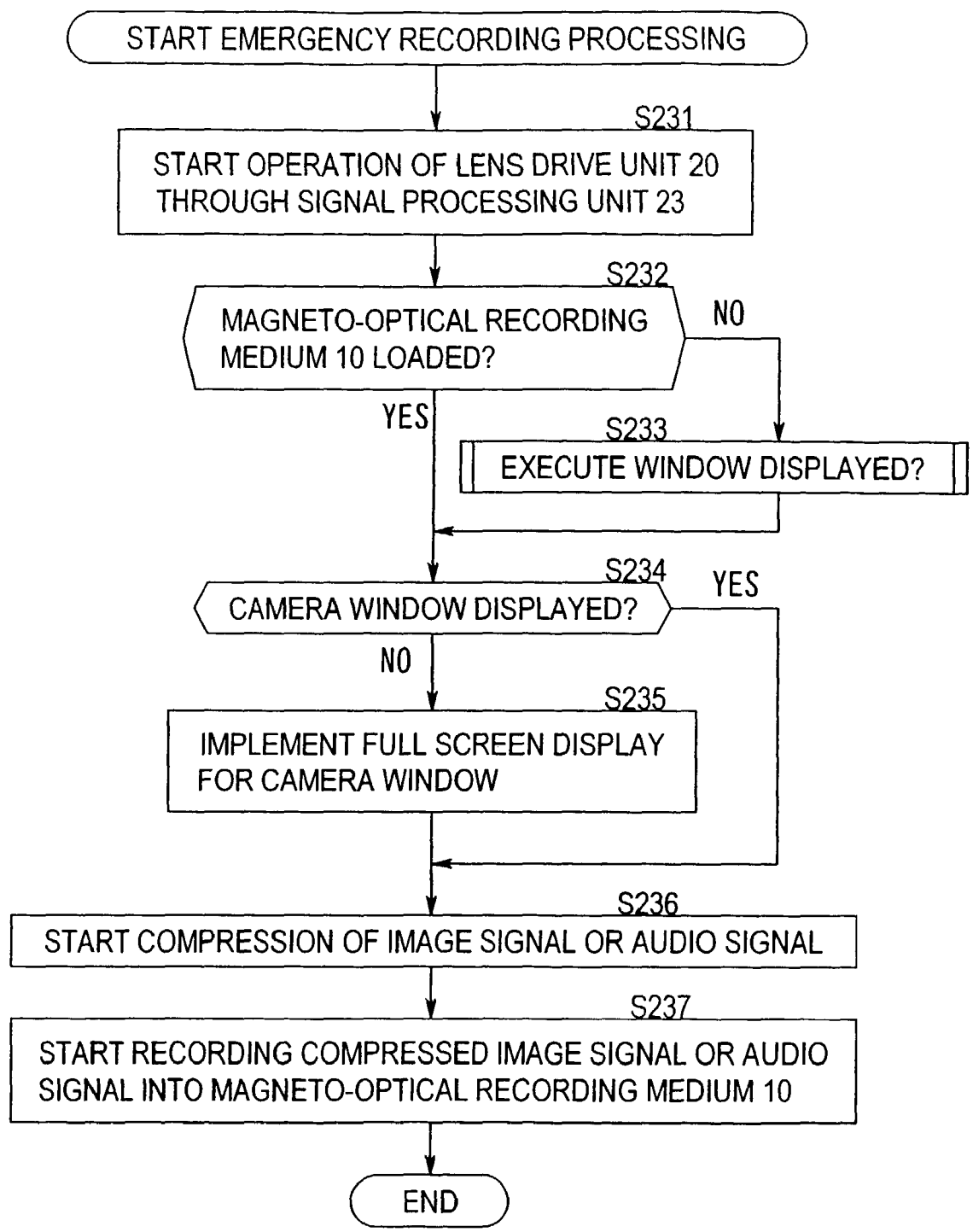
FIG. 30 is a flowchart illustrating the emergency recording processing.

FIG. 30 is a flowchart illustrating the emergency recording processing performed in step S215 in FIG. 27. First, in step S231, the control unit 34 starts operation of the individual units, i.e., the lens drive unit 20~the signal processing unit 23. In other words, a source voltage supply to the lens drive unit 20~the signal processing unit 23 starts. With this, image signals corresponding to the optical images of the subject taken in from the image-capturing lens 103 are sequentially stored in the frame memory 24. Next, the operation proceeds to step S232 to make a decision as to whether or not a magneto-optical recording medium 10 has been loaded. If it is decided that no-magneto-optical recording medium 10 has been loaded, the no-disk processing is executed in step S233 before the operation proceeds to step S234.

If it is decided in step S232 that a magneto-optical recording medium 10 has been loaded, the operation proceeds to step S234 to make a decision as to whether or not the camera window is on display. If it is decided in step S234 that the camera window is on display, the operation proceeds to step S236. If, on the other hand, it is decided in step S234 that the camera window has not been brought up on display yet, the operation proceeds to step S235 in which the control unit 34 implements control of the display image generating unit 33 to display the camera window on the entire screen of the liquid crystal display unit 104A. In the following explanation, the display implemented over the entire screen is referred to as full screen display. Through this process, the image of the subject is displayed on the camera window.

Figure 31:
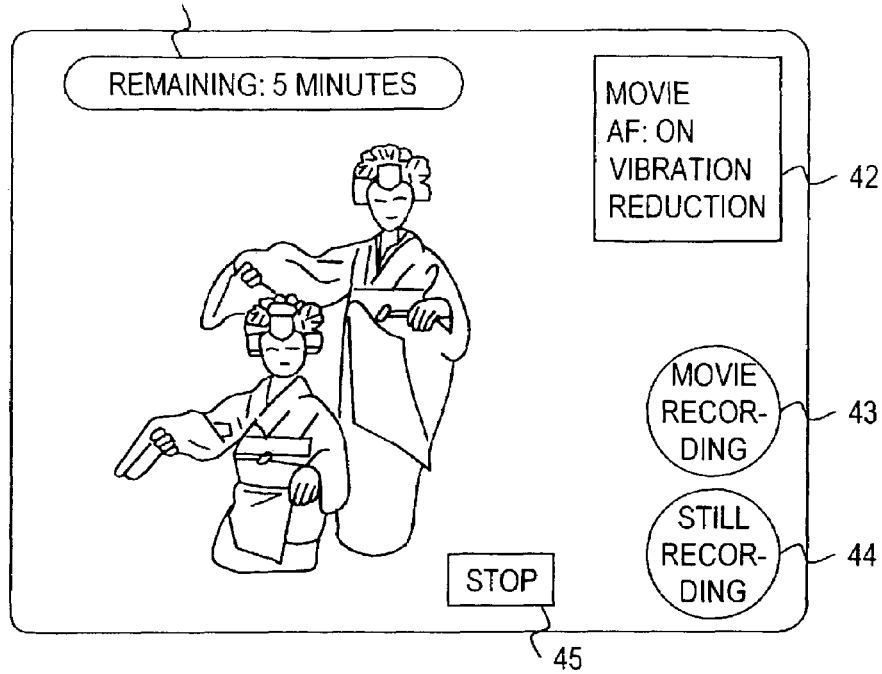
FIG. 31 presents an example of display on the camera window.

FIG. 31 presents an example of the camera window display in this process. In the example, the remaining photographing time is displayed in an area 41 of the camera window, with the details of the mode that has been set (photographing setting) displayed in an area 42. This point will be detailed later in reference to FIG. 35. A dynamic image record button 43 is operated when starting dynamic image (movie) recording, whereas a still image record button 44 is operated when starting still image (still) recording. A stop button 45 is operated when stopping a recording operation. It is to be noted that a trigger button, i.e., either the dynamic image record button 106 or the still image record button 107, is given priority in starting a recording operation.

To continue with the explanation given in reference to FIG. 30, in step S236, compression of an image signal or an audio signal starts, and then the operation proceeds to step S237 in which the recording of the image signal or the audio signal into the magneto-optical recording medium 10 starts. Subsequently, the operation is performed in the normal recording mode.

-Non-Disk Processing-

Figure 32:
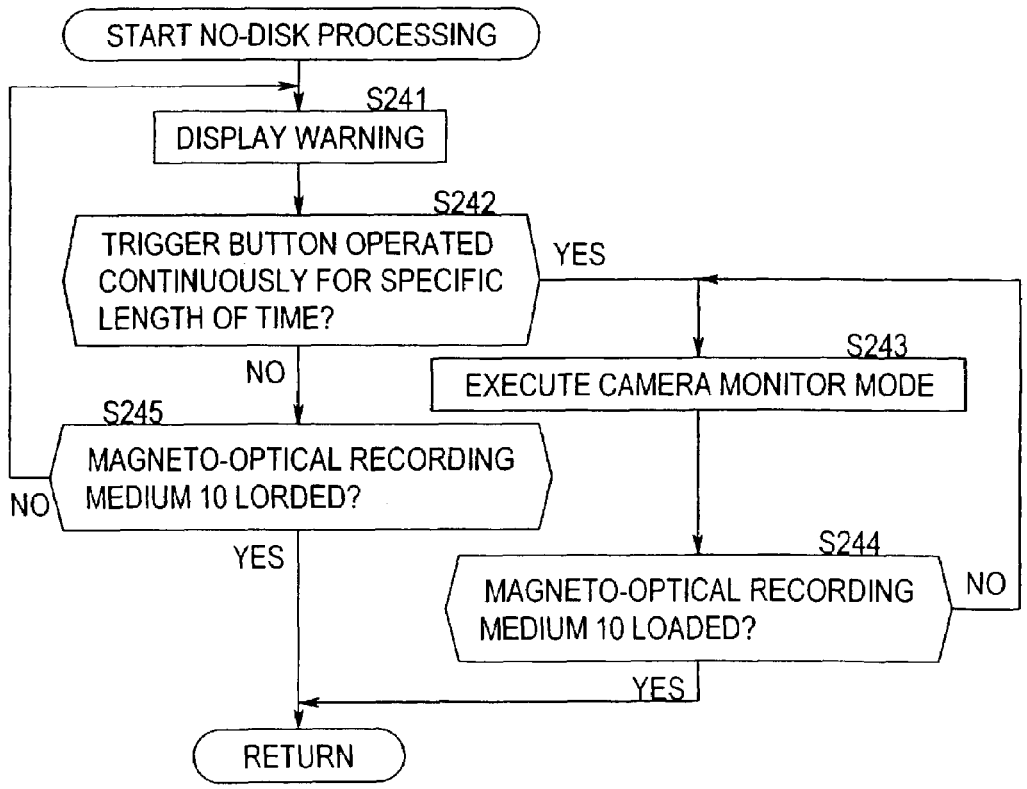
FIG. 32 is a flowchart illustrating the no-disk processing.
Figure 33:
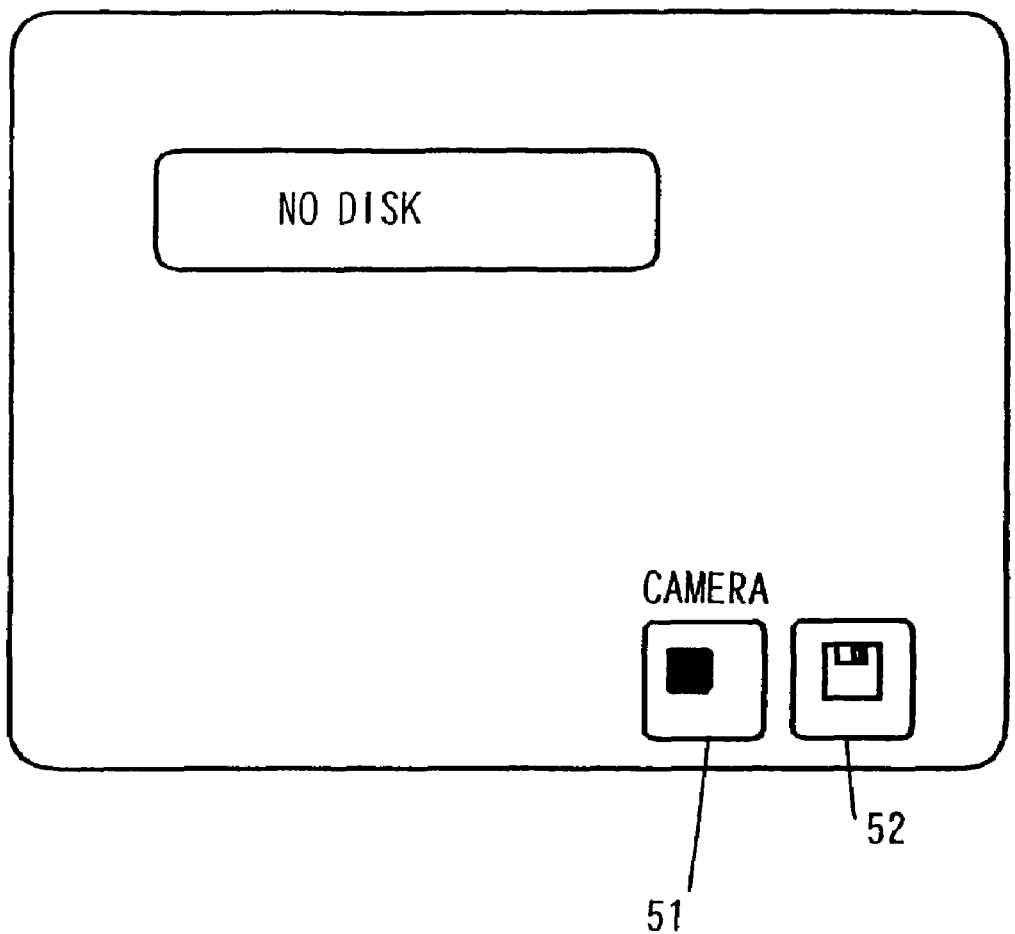
FIG. 33 presents an example of a warning display indicating that no-magneto-optical recording medium 10 is loaded.

FIG. 32 is a flowchart illustrating the non-disk processing performed in step S217 in FIG. 27 and in step S233 in FIG. 30. First, in step S241, the control unit 34 implements control on the display image-generating unit 33 to display a warning indicating that no-disk has been loaded. FIG. 33 presents an example of a warning display implemented at this point. In this example, a message "no disk" is displayed, with a camera icon 51 and a disk icon 52 also on display. The camera icon 51 indicates the camera window, and in this state, no source voltage is supplied to the individual portions of the camera unit 102 (the lens drive unit 20~the signal processing unit 23). Thus, wasteful consumption of power can be prevented. Likewise, the disk icon 52 is an icon corresponding to the disk window. The camera icon 51 or the disk icon 52 is displayed when the camera window or the disk window is not on display.

Figure 34:
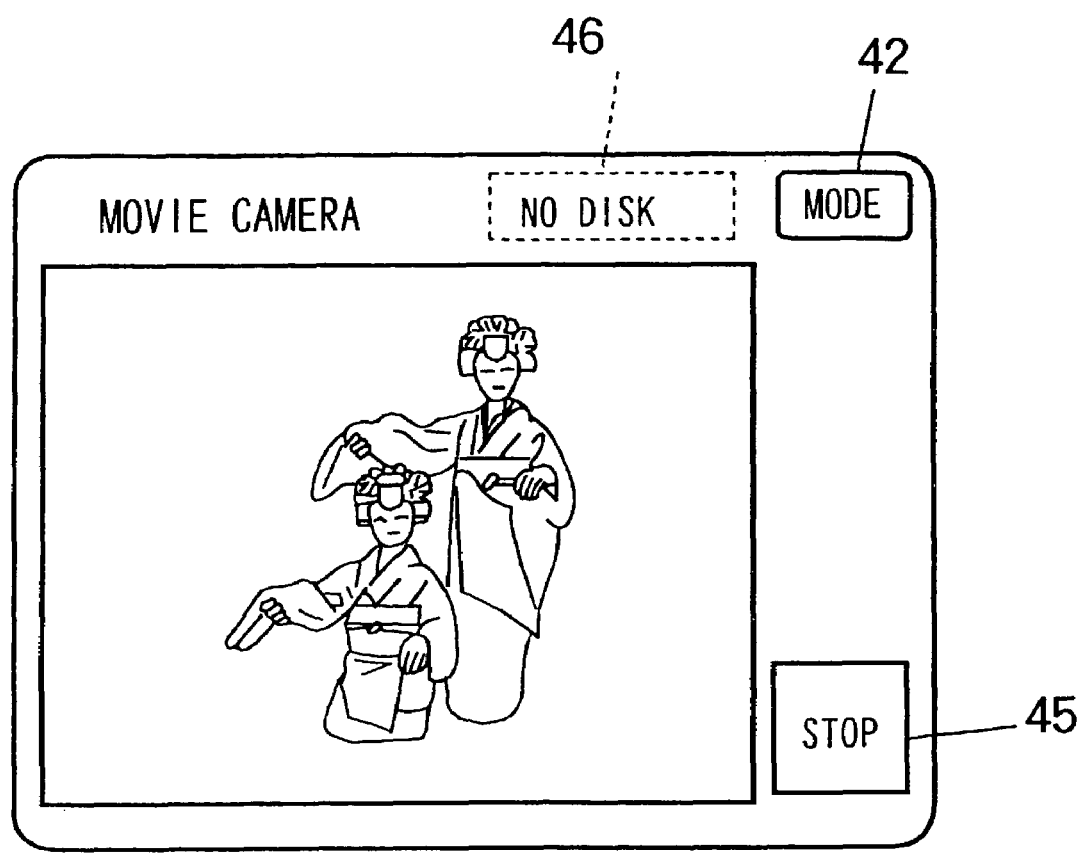
FIG. 34 presents an example of display on the camera window.

Next, the operation proceeds to step S242 to make a decision as to whether or not a trigger button has been operated continuously over a specific length of time. If it is decided that a trigger button has been operated continuously over the specific length of time, the operation proceeds to step S243 in which the control unit 34 executes a camera monitor mode. In more specific terms; the control unit 34 implements control of the display image generates unit 33 to implement monitor display of an image of the subject. However, the image signals are not recorded. FIG. 34 presents an example of display that may be implemented at this time. In the example, neither the dynamic image record button 43 nor the still image record button 44 is displayed, and the message "no disk" indicating that no-disk is loaded is displayed in an area 46. Then, the operation proceeds to step S244 to make a decision as to whether or not a magneto-optical recording medium 10 has been loaded. If it is decided that no-magneto-optical recording medium 10 has been loaded yet, the operation returns to step S243 to execute subsequent processing. If it is decided in step S244 that a magneto-optical recording medium 10 has been loaded, the operation returns to step S218 in FIG. 27 or step S234 in FIG. 30.

If it is decided in step S242 that no trigger button has been operated continuously over the specific length of time, the operation proceeds to step S245 to make a decision as to whether or not a magneto-optical recording medium 10 has been loaded. If it is decided that no-magneto-optical recording medium 10 has been loaded yet, the operation returns to step S241 to execute subsequent processing. If it is decided in step S245 that a magneto-optical recording medium 10 has been loaded, the operation returns to step S218 in FIG. 27 or step S234 in FIG. 30.

-Camera Window Initialization Processing-

Figure 35:
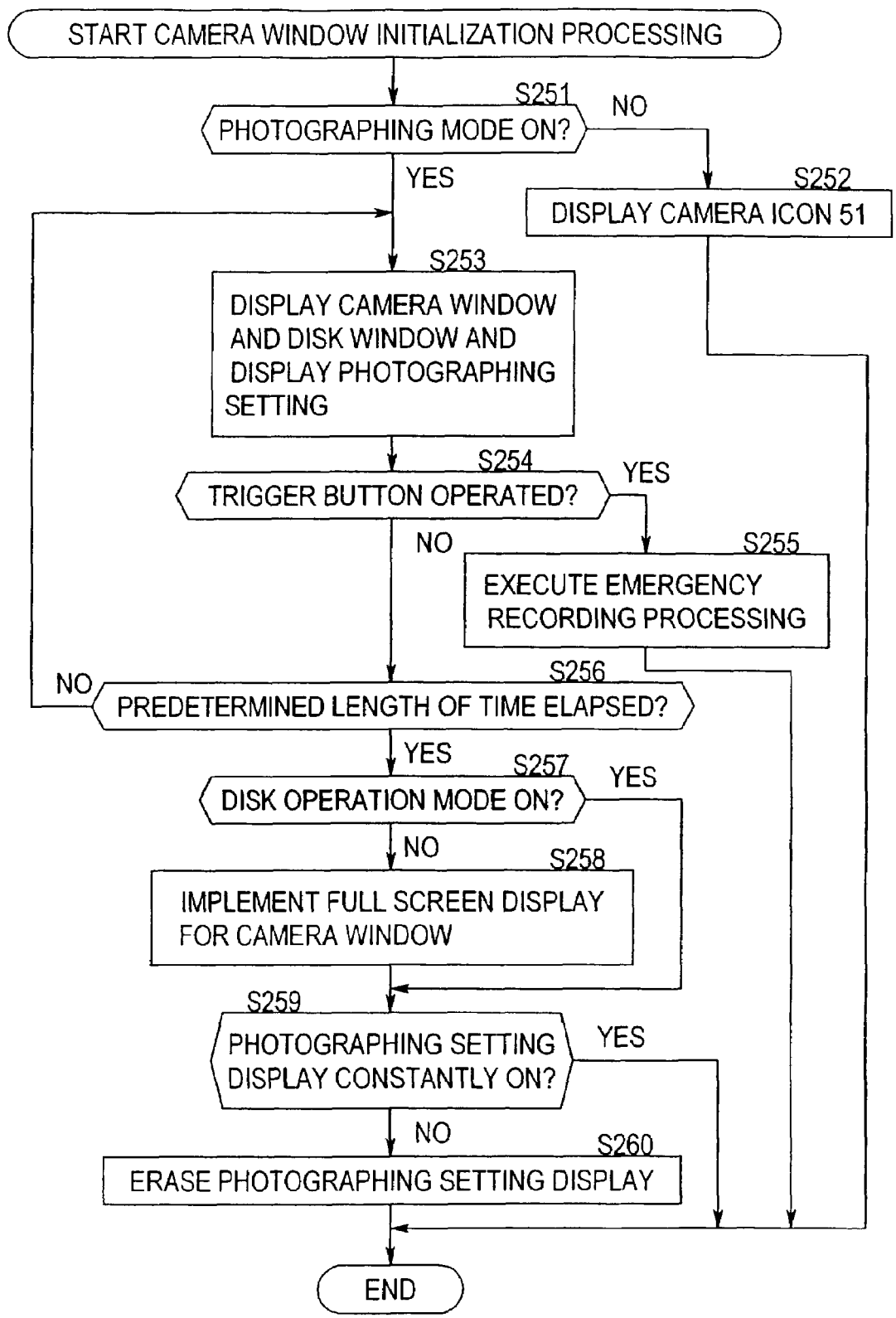
FIG. 35 is a flowchart illustrating the initialization processing for the camera window.

Next, the camera window or disk window initialization processing implemented in step S221 in FIG. 27 is explained. It is to be noted that the camera window initialization processing and the disk window initialization processing can be executed simultaneously through multitasking. FIG. 35 is a flowchart illustrating the initialization processing for the camera window. First, in step S51, a decision is made as to whether or not the photographing mode is set to ON, and if it is decided that the photographing mode is not set to ON, the operation proceeds to step S252 in which the control unit 34 implements control on the display image generating unit 33 to display the camera icon 51 before ending the processing.

Figure 36:
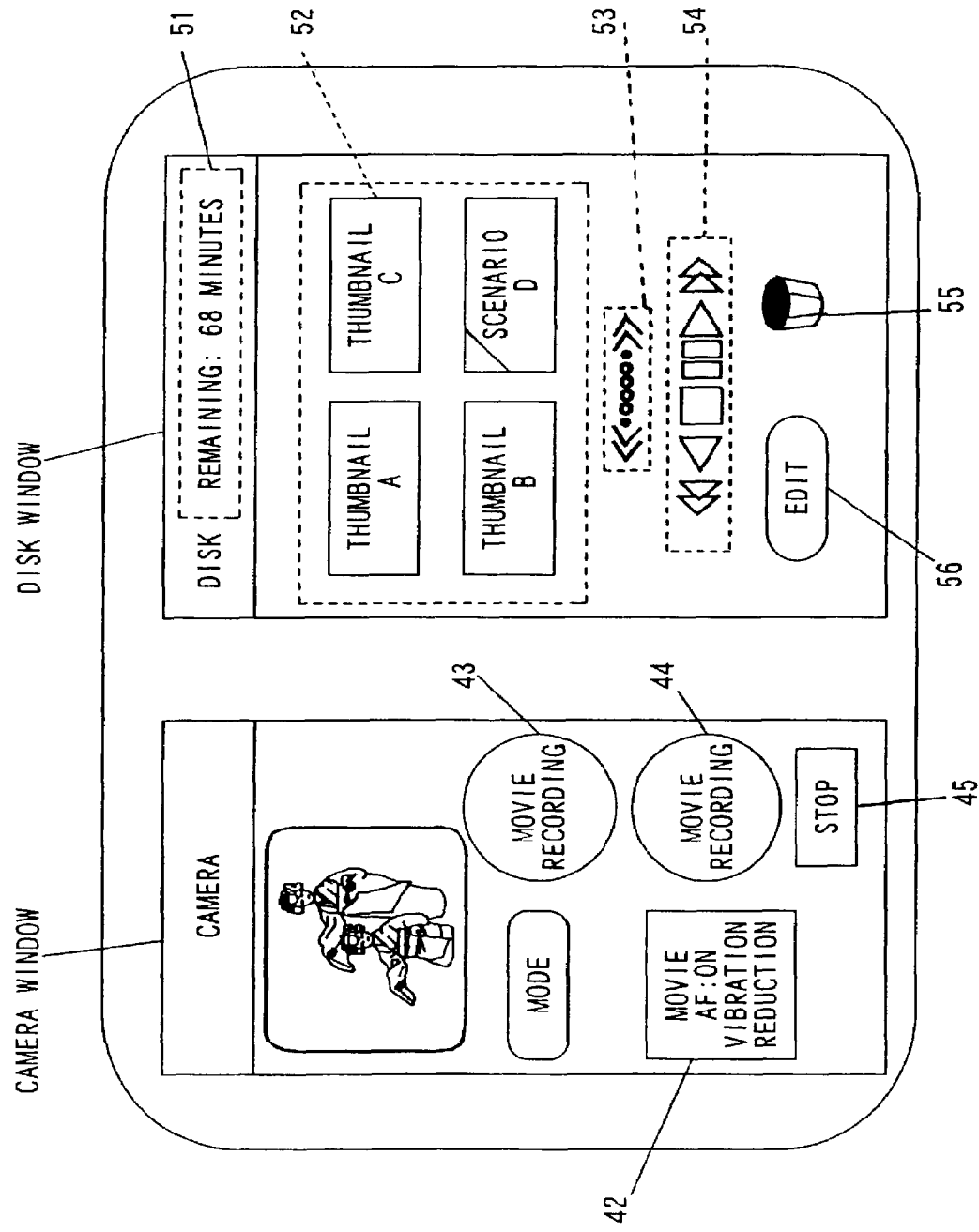
FIG. 36 presents an example of display on the camera window and the disk window.

If it is decided in step S251 that the photographing mode is set to ON, the operation proceeds to step S253 in which the control unit 34 implements control on the display image generating unit 33 to display the camera window and the disk window as a photographing setting screen. FIG. 36 presents an example of display that may be implemented at this point. In the example, the details of the photographing setting are displayed in the area 42 of the camera window. The remaining recording time is displayed in an area 51 of the disk window, with the thumbnails (representative images or reduced images) in regard to the contents recorded in the magneto-optical recording medium 10 or the scenario (text) displayed in an area 52. A scroll button 53 is operated when scrolling the display in the area 52. A command button 54 is operated when executing commands such as reproduction, stop, pause, fast-forward, rewind and the like. A delete button 55 is operated when deleting an image file corresponding to the thumbnail that has been selected. An edit button 56 is operated when performing a specific type of editing.

With the photographing setting displayed on the camera window display and display in regard to the contents of the magneto-optical recording medium 10 brought up in the disk window in this manner, the user can verify the previous photographing setting and the contents in the disk, i.e., the magneto-optical recording medium 10.

Next, the operation proceeds to step S254 to make a decision as to whether or not a trigger button has been operated, and if it is decided that a trigger button has been operated, the operation proceeds to step S255 to execute the emergency recording processing illustrated in FIG. 30. If it is decided in step S254 that no trigger button has been operated, a decision is made in step S256 as to whether or not a predetermined length of time has elapsed, and if it is decided that the predetermined length of time has not elapsed yet, the operation returns to step S253 to sustain a state in which the photographing setting screen is on display until the predetermined length of time has elapsed. If it is decided in step S256 that the predetermined length of time has elapsed, the operation proceeds to step S257 to make a decision as to whether or not the disk operation mode has been set to ON. If it is decided in step S257 that the disk operation mode has been set to ON, the operation proceeds to step S259.

If it is decided in step S257 that the disk operation mode has not been set to ON, the operation proceeds to step S258 in which the control unit 34 implements control on the display image generating unit 33 to implement full screen display of the camera window (see FIG. 31). Next, the operation proceeds to step S259 to make a decision as to whether or not the photographing setting display is set to constant ON. The constant ON or OFF setting for the photographing setting display can be set by the user in advance. If it is decided that the photographing setting display is set to constant ON, the initialization processing ends. If it is decided that the photographing setting display is not set to constant ON, the operation proceeds to step S60 in which the control unit 34 implements control on the display image generating unit 33 to erase the photographing setting display.

-Disk Window Initialization Processing-

Figure 37:
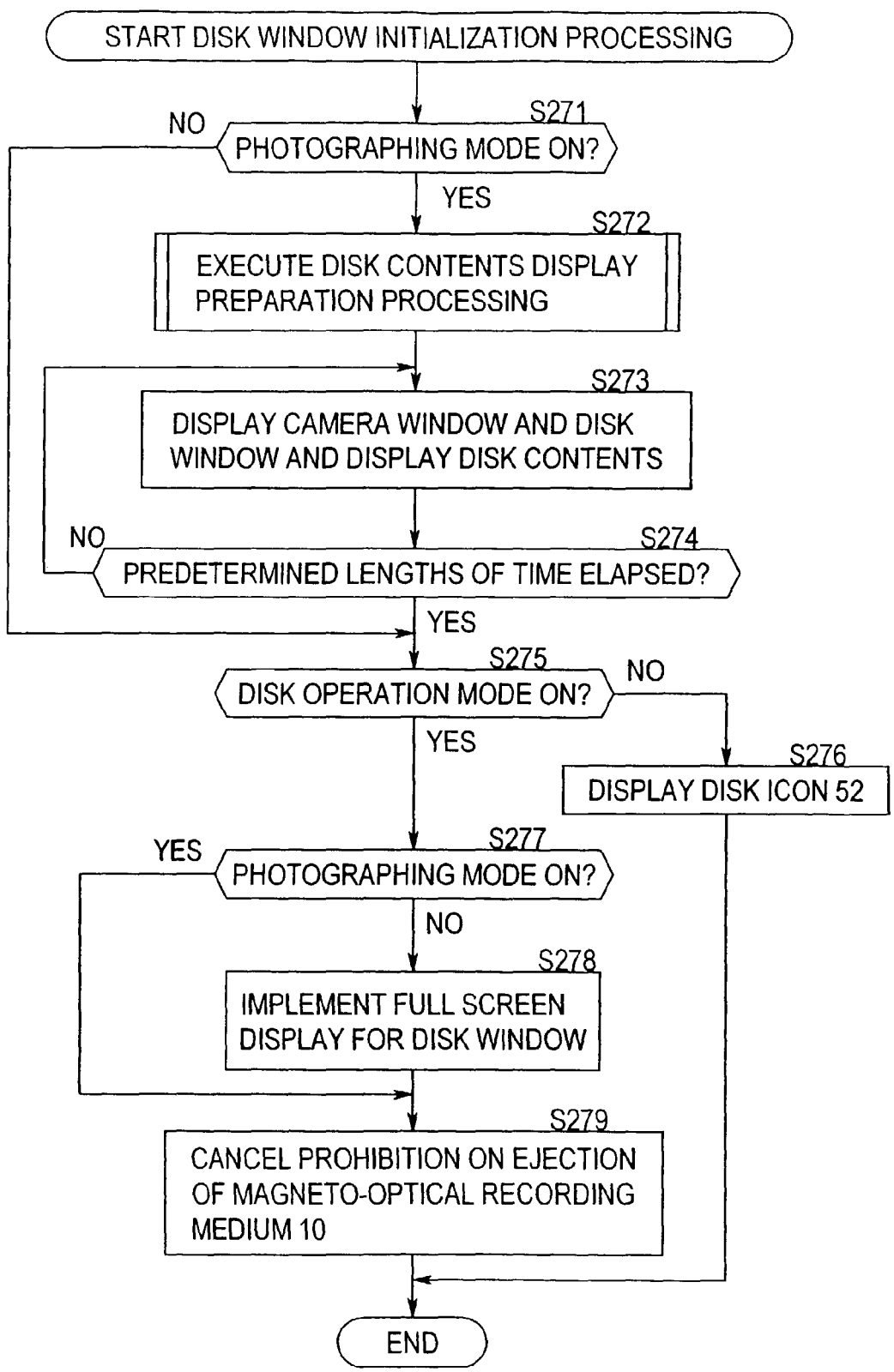
FIG. 37 is a flowchart illustrating the initialization processing for the disk window.

FIG. 37 is a flowchart illustrating the disk window initialization processing. First, in step S271, a decision is made as to whether or not the photographing mode has been set to ON, and if it is decided that the photographing mode has not been set to ON, the operation proceeds to step S275. If, on the other hand, it is decided in step S271 that the photographing mode has been set to ON, the operation proceeds to step S272 to execute the disk contents display preparation processing. This processing will be detailed later in reference to FIG. 39. In step S273, the control unit 34 implements control of the display image generating unit 33 to display the camera window and the disk window and to display the disk contents that have been prepared in the storage unit 37 on the disk window (see FIG. 36). Next, in step S274, a decision is made as to whether or not a predetermined length of time has elapsed. If it is decided that the predetermined length of time has not elapsed yet, the operation returns to step S273 to repeat the processing until the predetermined length of time has elapsed. If it is decided in step S274 that the predetermined length of time has elapsed, the operation proceeds to step S275 to make a decision as to whether or not the disk operation mode has been set to ON. If it is decided in step S275 that the disk operation mode has not been set to ON, the control unit 34 implements control on the display image-generating unit 33 in step S276 to display the disk icon 52 before ending the processing.

Figure 38:
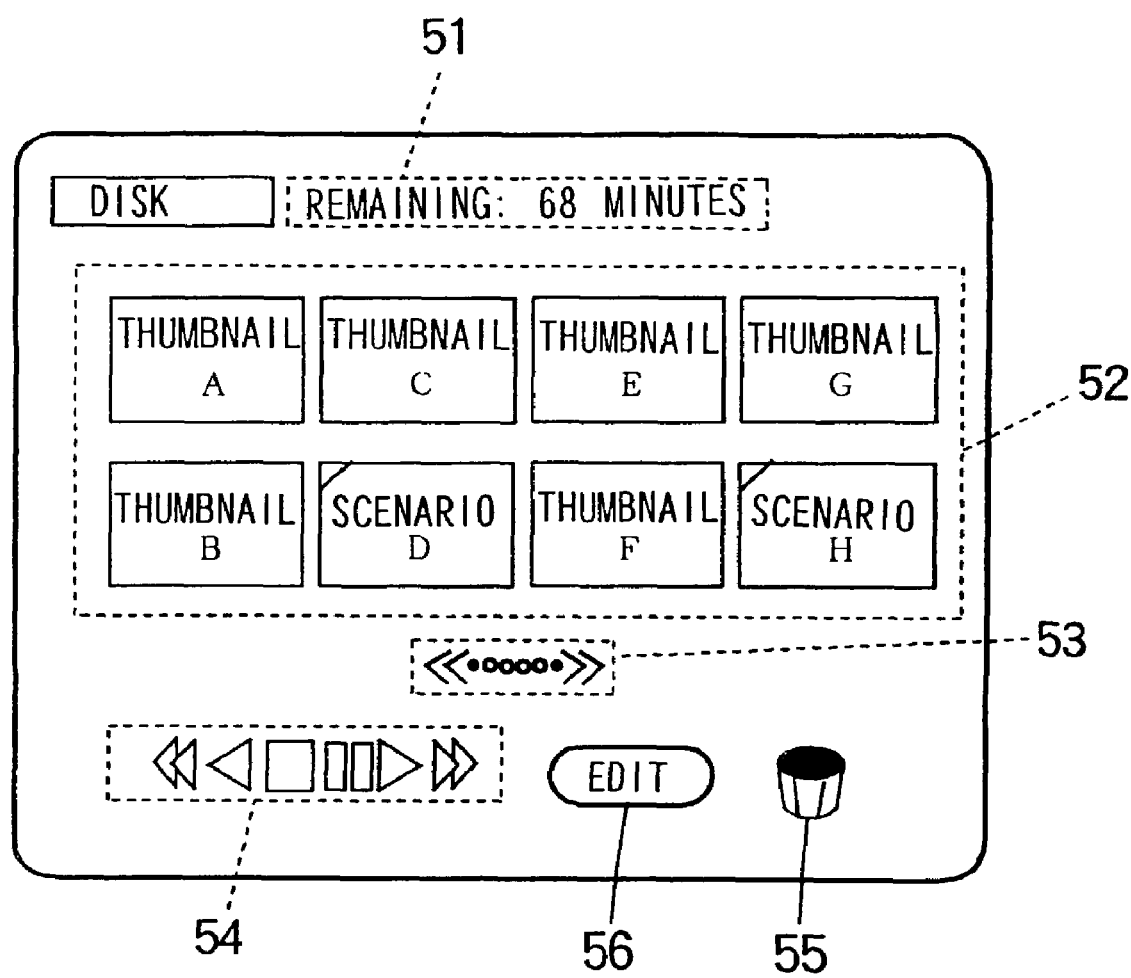
FIG. 38 presents an example of display on the disk window.

If it is decided in step S275 that the disk operation mode has been set to ON, the operation proceeds to step 277 to make a decision as to whether or not the photographing mode has been set to ON. If it is decided in step S277 that the photographing mode has been set to ON, the operation proceeds to step S279. If, on the other hand, it is decided in step S277 that the photographing mode has not been set to ON, the operation proceeds to step S278 in which the control unit 34 implements control on the display image generating unit 33 to implement full screen display of the disk window. FIG. 38 presents an example of a display that may be implemented at this time. Next, in step S279, the prohibition of ejection of the magneto-optical recording medium 10 is lifted.

-Disk Contents Display Preparation Processing-

Figure 39:
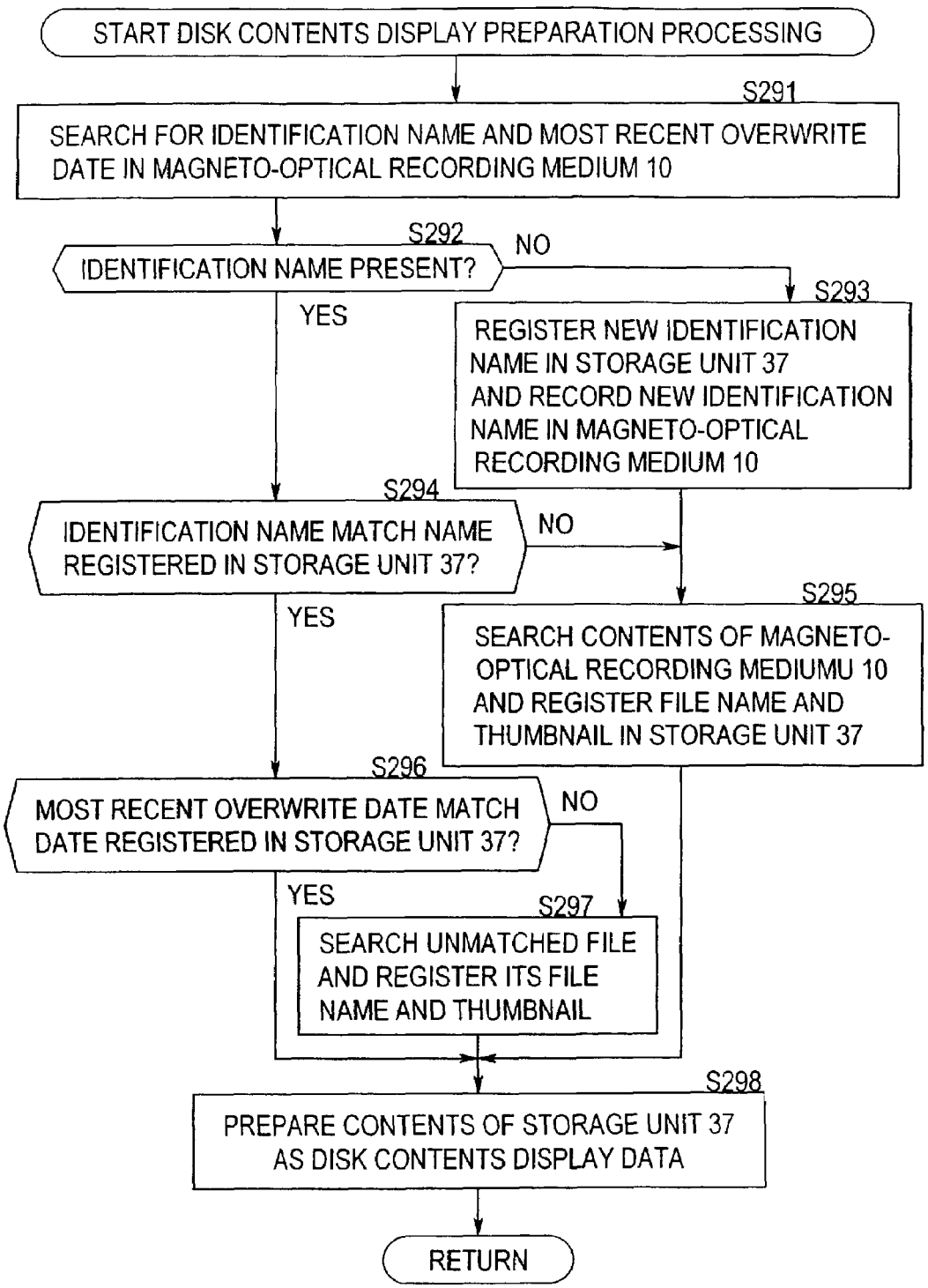
FIG. 39 is a flowchart illustrating the disk contents display preparation processing.

FIG. 39 is a flowchart illustrating the disk contents display preparation processing implemented in step S272 in FIG. 37. First, in step S291, the data access unit 27 performs a search for the identification name and the most recent overwrite date of a magneto-optical recording medium 10. Identification names in the magneto-optical recording medium 10 comprises an identification portion for identifying the movie camera (a camera identification portion) and an identification portion for identifying the disk (a disk identification portion). It is to be noted that the identification name can be specified by the user. For instance, identification names may be managed by using a management file having a disk identification portion. In step S292, a decision is made as to whether or not an identification name is present in the magneto-optical recording medium 10, i.e., whether or not a search has been performed, and if it is decided that no identification name is present, i.e., that a search has not been performed, the operation proceeds to step S293, in which the control unit 34 registers a new identification name in the storage unit 37 constituted of, for instance, a RAM, and records (writes) the new identification name in the magneto-optical recording medium 10 before the operation proceeds to step S295.

If it is decided in step S292 that an identification name is present, i.e., that a search has been performed, the operation proceeds to step S294 to make a decision as to whether or not the identification name matches an identification name registered in the storage unit 37. If it is decided that the identification name does not match an identification name registered in the storage unit 37, the operation proceeds to step S295 in which the data access unit 27 searches the contents of the magneto-optical recording medium 10 and the control unit 34 registers the file name and its thumbnail obtained through the search in the storage unit 37 before the operation proceeds to step S298.

If it is decided in step S294 that the identification name matches one registered in the storage unit 37, the operation proceeds to step S296 to make a decision as to whether or not the most recent overwrite date matches the one registered in the storage unit 37. If it is decided that the most recent overwrite date does not match a date registered in the storage unit 37, the operation proceeds to step S297 In step S297, the data access unit 27 searches for a non-matching file and the control unit 34 registers the file name and the thumbnail of the non-matching file thus searched in the storage unit 37 before the operation proceeds to step S298.

If it is decided in step S296 that the most recent overwrite date matches a date registered in the storage unit 37, the operation proceeds to step S298 to prepare the contents of the storage unit 37 as disk contents display data.

-Trigger Lock Release Processing-

Figure 40:
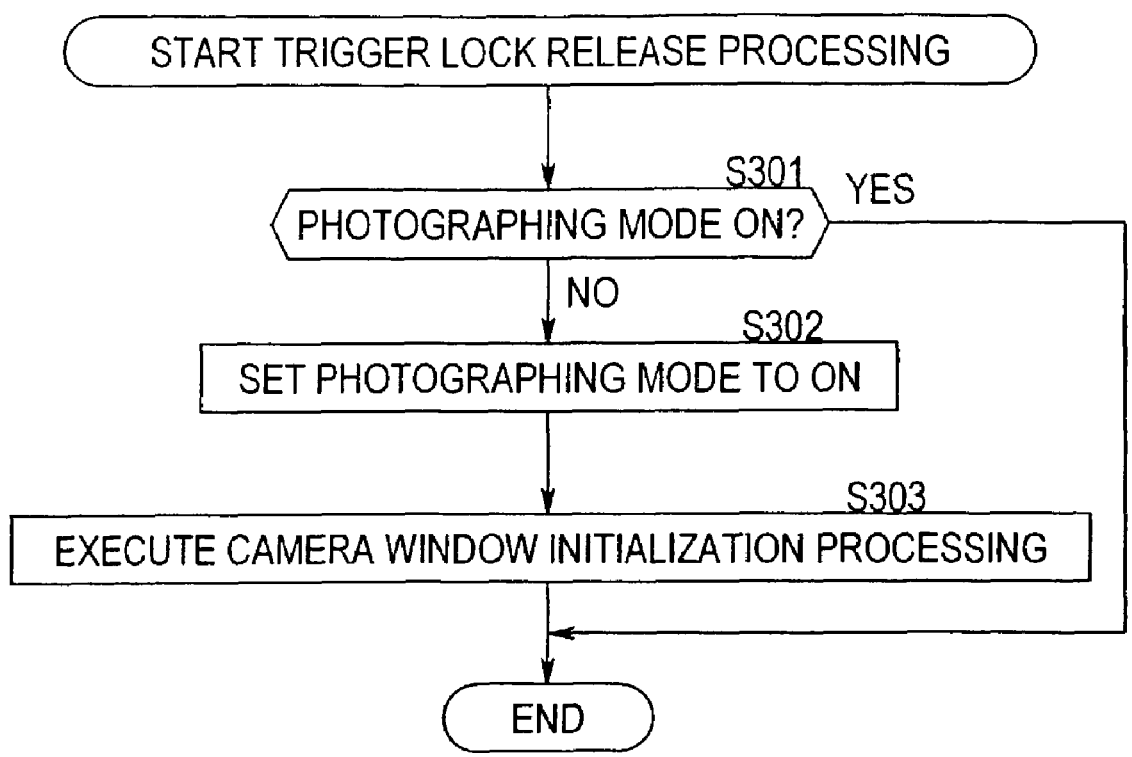
FIG. 40 is a flowchart illustrating the trigger block release processing.
Figure 41:
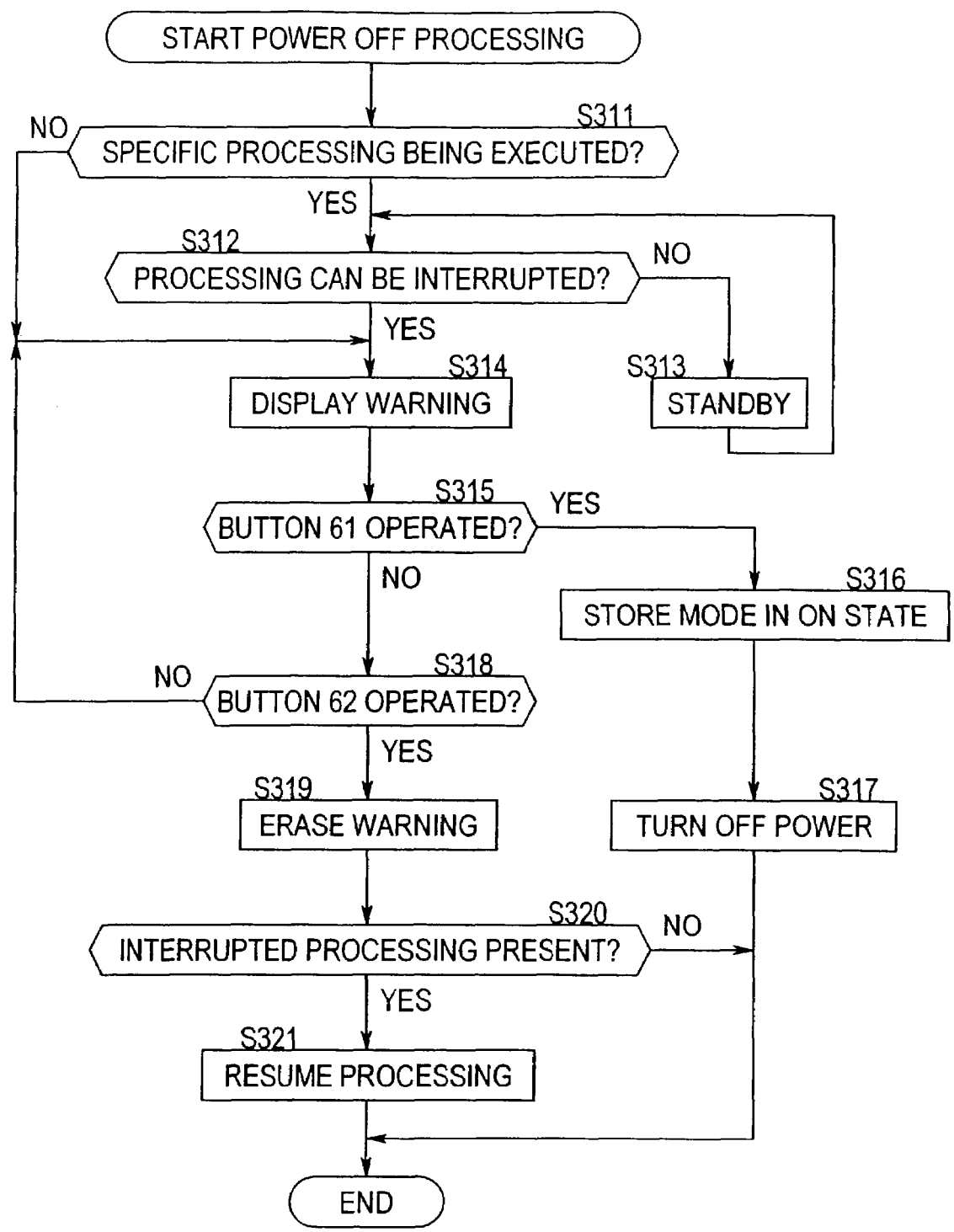
FIG. 41 is a flowchart illustrating the power off processing.

Now, the operation performed by the information processing apparatus when the trigger lock is released by the user switching the position of the lever of the selector switch 111 to the standby position in a state in which the power to the movie camera is turned on, for instance, is explained in reference to FIG. 40. First, in step S301, a decision is made as to whether or not the photographing mode has been set to ON, and if it is decided that the photographing mode has been set to ON, the processing ends. If it is decided in step S301 that the photographing mode has not been set to ON, the operation proceeds to step S302 in which the control unit 34 sets the photographing mode to on and in step S303, the camera window initialization processing illustrated in FIG. 35 is executed.

-Power Off Processing-

Next, the operation of the movie camera performed when the power switch 105 is turned off is explained. In step S311, a decision is made as to whether or not a specific type of processing is currently being executed. If it is decided that no processing is currently being executed, the operation proceeds to step S314. If it is decided in step S311 that a specific type of processing is being executed, a decision is made in step S312 as to whether or not it is possible to interrupt the processing. For instance, if the processing performed in units of GOPs (group of picture) is finished or if a disk access has been completed during a recording or reproduction operation, the processing can be interrupted. If it is decided in step S312 that the processing cannot be interrupted, the operation is set to a standby state in step S313 before returning to step S312. Namely, if GOP processing has not been finished or if a disk access is in progress, it is decided that the processing cannot be interrupted.

Figure 42:
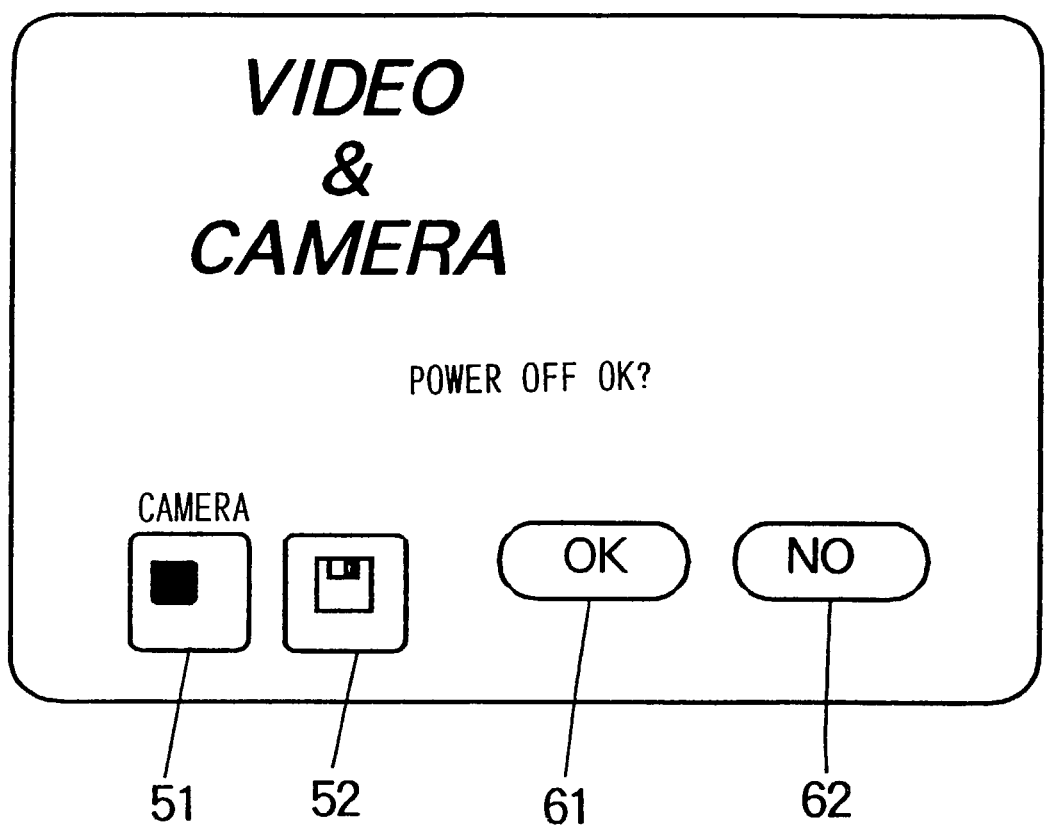
FIG. 42 presents an example of a warning display that indicates whether or not a power-off is to be executed.

If it is decided in step S312 that the processing performed in units of GOPs has been finished or a disk access has been completed, i.e., if it is decided that the processing can be interrupted, the control unit 34 implements control on the display image generating unit 33 in step S314 to display a warning that indicates whether or not power can be turned off, as illustrated in FIG. 42, for instance. In the display example presented in FIG. 42, a message, "power off OK?" a button 61 to specify that a power-off is to be executed and a button 62 to specify that a power-off is to be canceled are displayed. Then the operation proceeds to step S315 to make a decision as to whether or not the user has operated the button 61, and if it is decided that the button 61 has been operated, the control unit 34 stores whether the photographing mode or the disk operation mode has been set to ON in the storage unit 37 before turning off the power in step S317.

If it is decided in step S315 that a button 61 has not been operated, the operation proceeds to step S318 to make a decision as to whether or not the user has operated the button 62, and if it is decided that the button 62 has not been operated, the operation returns to step S314 to execute the subsequent processing. If it is decided in step S318 that the button 62 has been operated, the control unit 34 implements control of the display image-generating unit 33 in step S319 to erase the warning display. Then, in step S320, a decision is made as to whether or not there is any processing that has been interrupted. If it is decided that no processing has been interrupted, i.e., that no processing was being executed, or that the processing has been completed, the power off processing ends. If it is decided in step S320 that there is processing that has been interrupted, the operation proceeds to step S321 in which the control unit 34 resumes execution of the interrupted processing.

It is to be noted that the computer program that executes the various types of processing described above may be provided to the user via a recording medium such as a magnetic disk or a CD ROM, or it may be provided to the user via a provider medium such as a network so that it can be recorded in an internal RAM or a hard disk as necessary for use.

As explained above, in the information reproduction apparatus in the second embodiment, the mode that is set at the point in time when power is turned off, i.e., the photographing mode related to the generation of image signals (the first mode), the disk operation mode related to image files recorded at the recording medium (the second mode) or both of these modes, is stored and when the power is turned on, the photographing mode or the disk operation mode is set in correspondence to the contents that have been thus stored. This makes it possible for the user to, for instance, continuously use the mode that was set for the previous operating session.

What is claimed is:

1. A dynamic image processing apparatus comprising:
   an image processing circuit that receives data of a scene formed by a sequence of dynamic images that are continuous over time, divides the dynamic images into specific quantity units, compresses each of the specific quantity units of the dynamic images, adds header information, which shows a reproduction order to the compressed specific quantity units of each of the dynamic images, and records as respective independent files in a storage device specific quantity units of dynamic images to which header information has been added.

2. A dynamic image processing apparatus according to claim 1, wherein:
   said image processing circuit forms each divisional specific units of the dynamic images every specific time or specific data quantity.

3. A dynamic image processing apparatus according to claim 1, wherein:
   said image processing circuit forms each divisional specific units of the dynamic images which contains a specific number of GOPs to be compressed by adopting the MPEG method.

4. A dynamic image processing apparatus according to claim 1, wherein:
   said image processing circuit also records information indicating continuity over time of a plurality of dynamic image files that have been divisionally formed.

5. A dynamic image processing apparatus according to claim 1, further comprising:
   a photographing device that photographs a moving object to form dynamic images, wherein:
   said image processing circuit processes data of the dynamic images photographed by said photographing device to be compressed and recorded.

6. A dynamic image processing apparatus according to claim 1, wherein:
   said image processing circuit records a thumbnail image, which is a still image extracted from the dynamic images, in header information of the specific quantity unit of a heading from among the scene formed by the sequence of dynamic images.

* * * * *